(12) United States Patent
Malladi

(10) Patent No.: US 12,171,012 B2
(45) Date of Patent: Dec. 17, 2024

(54) METHODS AND APPARATUS FOR SUPPORTING BAND STEERING AND/OR CHANNEL STEERING IN WIFI COMMUNICATIONS SYSTEMS

(71) Applicant: Charter Communications Operating, LLC, St. Louis, MO (US)

(72) Inventor: Pratyusha Malladi, Colorado Springs, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/203,053

(22) Filed: May 29, 2023

(65) Prior Publication Data

US 2023/0309129 A1 Sep. 28, 2023

Related U.S. Application Data

(63) Continuation of application No. 17/090,861, filed on Nov. 5, 2020, now Pat. No. 11,665,717.

(51) Int. Cl.
*H04W 72/52* (2023.01)
*H04W 24/10* (2009.01)
*H04W 28/02* (2009.01)
*H04W 72/541* (2023.01)

(52) U.S. Cl.
CPC .......... *H04W 72/52* (2023.01); *H04W 24/10* (2013.01); *H04W 28/0252* (2013.01); *H04W 28/0289* (2013.01); *H04W 72/541* (2023.01)

(58) Field of Classification Search
CPC ... H04W 72/52; H04W 72/541; H04W 24/10; H04W 28/0252; H04W 28/0289
See application file for complete search history.

(56) References Cited

U.S. PATENT DOCUMENTS

| 10,374,749 B1* | 8/2019 | Kulkarni | H04B 17/345 |
| 2008/0233948 A1* | 9/2008 | Kazmi | H04W 72/541 |
| | | | 455/501 |

(Continued)

*Primary Examiner* — Chi H Pham
*Assistant Examiner* — Weibin Huang
(74) *Attorney, Agent, or Firm* — Straub & Straub; Michael P. Straub; Stephen T. Straub

(57) ABSTRACT

Methods and apparatus for supporting band steering and/or channel steering in wireless communications systems, e.g. WiFi communications systems, are described. An access point aggregates information, e.g., from messages being communicated between the access point and client devices being serviced by the access point, and generates reports. The generated reports are communicated to a control device, e.g. a radio resource management (RRM) device. In some embodiments, generated reports include one or more of: i) message header information, e.g. resource unit (RU) allocation and/or use information and/or BSS color information, ii) collision reports, iii) received signal strength indicator (RSSI) reports, signal to noise ratio (SNR) reports, iv) interference reports; v) power information; vi) access point measurement information; and vii) access point control information. The control device uses the received reports from APs, in making bandsteering decisions with regard to individual client devices, and channel change decisions with regard to access points.

20 Claims, 20 Drawing Sheets

(56) References Cited

U.S. PATENT DOCUMENTS

| | | | |
|---|---|---|---|
| 2015/0065157 A1* | 3/2015 | Homchaudhuri | H04W 72/541 |
| | | | 455/452.1 |
| 2015/0271829 A1* | 9/2015 | Amini | H04W 24/02 |
| | | | 370/329 |
| 2017/0181191 A1* | 6/2017 | Wen | H04W 74/0816 |
| 2018/0279130 A1* | 9/2018 | Huang | H04W 72/0453 |
| 2018/0310279 A1* | 10/2018 | Pathak | H04W 16/02 |
| 2019/0037418 A1* | 1/2019 | Gunasekara | H04W 52/40 |
| 2021/0120454 A1* | 4/2021 | Chennichetty | H04B 7/0452 |
| 2021/0297945 A1* | 9/2021 | Ergen | H04W 48/20 |

\* cited by examiner

| FIGURE 7A | FIGURE 7B | FIGURE 7C | FIGURE 7D | FIGURE 7E |

FIGURE 7

METHODS AND APPARATUS FOR SUPPORTING BAND STEERING AND/OR CHANNEL STEERING IN WIFI COMMUNICATIONS SYSTEMS

RELATED APPLICATIONS

The present application is a continuation of U.S. patent application Ser. No. 17/090,861 filed Nov. 5, 2020 which was Published on May 5, 2022 as Publication No.: US 2022-0141825 A1 and which is hereby expressly incorporated by reference in its entirety.

FIELD

The present invention relates to use of wireless communications systems, and more particularly, to methods and apparatus for supporting band steering and/or channel steering in WiFi communications systems.

BACKGROUND

WiFi access points are often capable of supporting communication in multiple frequency bands, e.g., a 2.4 GHz band and a 5 GHz band. While WiFi access points often support the use of multiple frequency bands, user devices often support and use a single frequency band at a given time. Accordingly individual user devices normally use one of the 2.4 GHz or 5 GHz bands but not both at any given time. An access point can control which frequency band a UE will use at a given time. The 5 GHz band being at a higher frequency than the 2.4 GHz band sufferers from a shorter signal range than the 2.4 GHz band since 5 GHz signals are less able, compared to 2.4 GHz signals, to penetrate solid object and walls. While the 5 GHz band suffers in terms of range as compared to the 2.5 GHz band, given the higher frequency it is normally able to support higher data rates to a UE than the 2.5 GHz range in cases where 5 GHz signal strength to a UE is good.

As discussed above, a WiFi access point often supports multiple frequency bands. The frequency band is often divided into multiple channels. Within a frequency band a WiFi access point normally uses a single one of the plurality of channels to communicate to UE devices. As a result if a WiFi access point switches channels, this often results in the multiple UEs which were using the WiFi access point as a point of network attachment to briefly stop using the channel that was previously being used by the AP to which the UEs are attached and to switch to the channel to which the AP switches. While a channel change by an AP within a frequency band will normally not affect which frequency band UEs are using, it temporally interferes with communication since the UEs that were using the channel need to implement a channel switch in response to the AP channel switch. Accordingly, a channel switch can affect, e.g., disrupt, communication of multiple UEs at the same time.

While WiFi APs can make band assignment decisions and channel change decisions they normally have limited information available to them for making such decisions. As the number of WiFi APs increases, the potential for interference between APs increases. This is particularly the case in apartment buildings or other locations where APs may be physically in close proximity to one another but operated by different individuals, e.g., neighbors. Unfortunately making band and/or channel decisions based on limited locally available interference information can result in suboptimal band and/or channel selection and/or use decisions.

In view of the above it should be appreciated that there is a need for methods and/or apparatus which would allow AP band and/or channel change decisions to be based on not only locally detectable signal interference but also information about channel and/or band usage by devices, e.g., APs and/or UE in physical proximity to the AP or UE for which band and/or channel decisions are to be made to facilitate efficient use of available spectrum and/or reduce the risk of interference between devices using the available spectrum.

SUMMARY

Methods and apparatus for supporting band steering and/or channel steering in wireless communications systems, e.g. WiFi communications systems, are described. In various embodiments, an access point aggregates information, e.g., from messages being communicated between the access point and client devices being serviced by the access point, and generates reports. The generated reports are communicated to a control device, e.g. a radio resource management (RRM) device. In some embodiments, generated reports include one or more of: i) message header information, e.g. resource unit (RU) allocation and/or use information and/or BSS color information, ii) client device collision reports, iii) client device received signal strength indicator (RSSI) reports, client device signal to noise ratio (SNR) reports, iv) client device interference reports; v) client device power information; vi) access point measurement information; and vii) access point control information. The control device uses the received reports from APs, in making bandsteering decisions with regard to individual client devices, and channel change decisions with regard to access points. In some embodiments, the control device or the access point determines when the bandsteering or channel change should occur, e.g., with the intent to make the change at a point of low activity to minimize disruptions in the system when possible. In some embodiments, in addition to the information from the reports, profile information corresponding to individual client devices, profile information corresponding to the access points, knowledge of the network infrastructure capabilities and settings, and/or knowledge of access point locations and power levels, is retrieved and used in making the decisions. In some embodiments, the control device is a management entity or agent in the cloud.

An exemplary method of controlling wireless resource utilization, in accordance with some embodiments, includes: determining whether a first client device has reported a received signal strength indicator (RSSI) corresponding to a second frequency band that satisfies, e.g. meets or exceeds, a steering threshold for steering the first client device to the second frequency band; and instructing a first access point, based on said determination as to whether the first client device has reported a received signal strength indicator (RSSI) corresponding to the second frequency band that satisfies the steering threshold for steering the first client device to the second frequency band, to: i) keep the first client device on a first frequency band or ii) steer the first client device to the second frequency band. An exemplary control device for controlling wireless resource utilization, in accordance with some embodiments, comprises: an interface for communicating with access points; and a processor configured to operate the control device to: determine whether a first client device has reported a received signal strength indicator (RSSI) corresponding to a second frequency band that satisfies (e.g., meets or exceeds) a steering threshold for steering the first client device to the second frequency band; and instruct a first access point, based on said determination as to whether the first client device has reported a received signal strength indicator (RSSI) corresponding to the second frequency band that satisfies the steering threshold for steering the first client device to the second frequency band, to: i) keep (315) the first client device on a first frequency band or ii) steer the first client device to the second frequency band.

Various features relate to methods and apparatus for supporting band steering of client devices supporting communications in a plurality of wireless communications bands and/or channel steering of access points, e.g., WiFi access points, and client devices being serviced by the access points.

While various features discussed in the summary are used in some embodiments it should be appreciated that not all features are required or necessary for all embodiments and the mention of features in the summary should in no way be interpreted as implying that the feature is necessary or critical for all embodiments. Numerous additional features and embodiments are discussed in the detailed description which follows. Numerous additional benefits will be discussed in the detailed description which follows.

BRIEF DESCRIPTION OF THE FIGURE

FIG. 7, comprises the combination of FIG. 7A, FIG. 7B, FIG. 7C, FIG. 7D and FIG. 7E.

DETAILED DESCRIPTION

Figure 1:
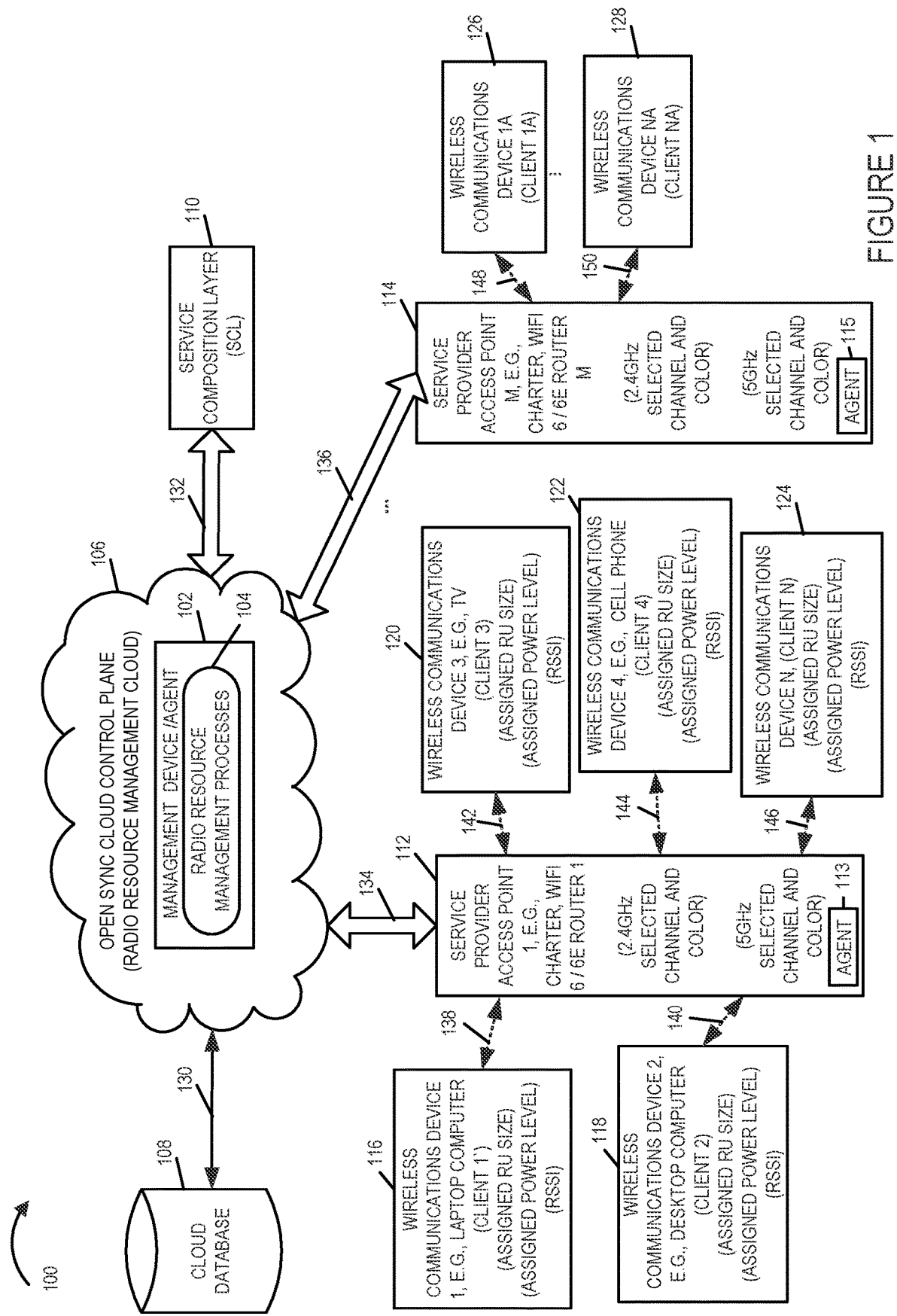
FIG. 1 is a drawing of an exemplary system implemented in accordance with the invention.

FIG. 1 is a drawing of an exemplary system 100 in accordance with an exemplary embodiment. Exemplary system 100 includes a management service/agent 102, sometimes referred to as a control device, a cloud database 108, a service composition layer (SCL) 110, and a plurality of service provider access points (service provider access point 1 112, . . . , service provider access point M 114), coupled together as shown in FIG. 1. The exemplary communications system 100 further includes a plurality of wireless communications devices coupled to each of the access points (112, . . . , 114). In some embodiments APs 112 and 114 are in the physical vicinity of each other so they are able to see each others PHY layer, e.g., each AP can and sometimes does receive signals transmitted by the other AP.

Management device/agent 102 includes radio resource management processes 104, e.g., used to implement steps of an exemplary method of controlling wireless resource utilization in accordance with an exemplary embodiment. In various embodiments, management device/agent 102 is part of an open synch cloud control plane 106, e.g., a radio resource management cloud. The management device/agent 102 is coupled to cloud database 108 via communications link 130. The management device/agent 102 is coupled to service composition layer (SCL) 110 via communications link 132. The management device/agent 102 is coupled to a plurality of service provider access points (access point 1 112, . . . , access point M 114), via communications links (134, . . . , 136), respectively.

Service provider access point 1 112, e.g., Charter WiFi 6/6E router 1, supports 2.4 GHz and 5 GHz communications bands, and is currently set at: i) a selected channel of the 2.4 GHz band with a selected color, and ii) a selected channel of the 5 GHz band with a selected color. Service provider access point 1 112 includes agent 113, e.g., an application for supporting communications and interactions with management device 102.

Service provider access point M 114, e.g., Charter WiFi 6/6E router M, supports 2.4 GHz and 5 GHz communications bands, and is currently set at: i) a selected channel of the 2.4 GHz band with a selected color, and ii) a selected channel of the 5 GHz band with a selected color. Service provider access point M 114 includes agent 115, e.g., an application for supporting communications and interactions with management device 102.

Exemplary communications system 100 further includes a plurality of wireless communications devices, which may be, and sometimes are coupled to a service provider access point via a wireless communications link. Exemplary wireless communications devices (wireless communications device 1 116, wireless communication device 2 118, wireless communications 3 120, wireless communications device 4 122, . . . , wireless communications device N 124) are coupled to service provider access point 1 112, via wireless communications links (138, 140, 142, 144, . . . , 146), respectively. Wireless communication device 1, e.g., a laptop computer, which is sometimes referred to as client device 1, has a currently assigned resource unit (RU) size, a currently assigned power level, and a measured received signal strength indicator (RSSI). Wireless communication device 2, e.g., a desktop computer, which is sometimes referred to as client device 2, has a currently assigned resource unit (RU) size, a currently assigned power level, and a measured received signal strength indicator (RSSI). Wireless communication device 2, e.g., a TV, which is sometimes referred to as client device 3, has a currently assigned resource unit (RU) size, a currently assigned power level, and a measured received signal strength indicator (RSSI). Wireless communication device 4, e.g., a cell phone, which is sometimes referred to as client device 4, has a currently assigned resource unit (RU) size, a currently assigned power level, and a measured received signal strength indicator (RSSI). Wireless communication device N, which is sometimes referred to as client device N, has a currently assigned resource unit (RU) size, a currently assigned power level, and a measured received signal strength indicator (RSSI).

Exemplary wireless communications devices (wireless communications device A1 126, . . . , wireless communications device NA 128) are coupled to service provider access point M 114, via wireless communications links (148, . . . , 150), respectively. Wireless communication device 1A, which is sometimes referred to as client device 1A, has a currently assigned resource unit (RU) size, a currently assigned power level, and a measured received signal strength indicator (RSSI). Wireless communication device NA, which is sometimes referred to as client device NA, has a currently assigned resource unit (RU) size, a currently assigned power level, and a measured received signal strength indicator (RSSI).

Individual wireless devices, e.g., client devices supporting communications in both the 2.4 GHz and 5 GHz band can be, and sometimes are, bandsteered on an individual basis, between the two alternative bands, under the control of the management device/agent 102 via the agent of an access point, e.g., in response to congestion determinations (based on captured BSS colors), RSSI reported information, and resource utilization information, in accordance with an exemplary embodiment.

An access point can be, and sometimes is, channel steered in each of its two bands (2.4 GHz and 5 GHz) under the control of management device/agent 102, e.g., in response to channel interference level determinations, in accordance with an exemplary embodiment.

Figures 2, 2A, 2B:
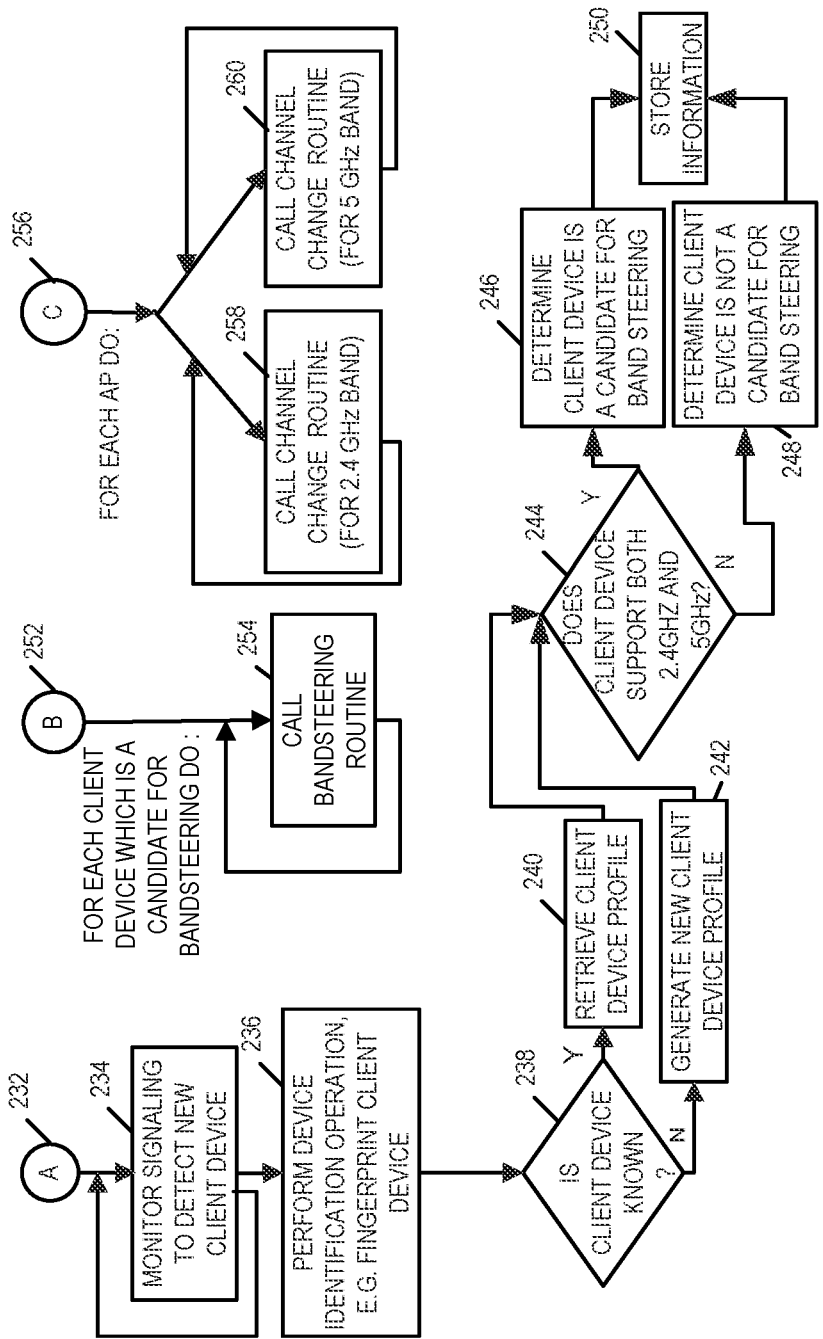
FIG. 2A is a first part of a flowchart of an exemplary method of controlling wireless resource utilization in accordance with an exemplary embodiment.
FIG. 2B is a second part of a flowchart of an exemplary method of controlling wireless resource utilization in accordance with an exemplary embodiment.
FIG. 2 comprises the combination of FIG. 2A and FIG. 2B.
Figure 2A:
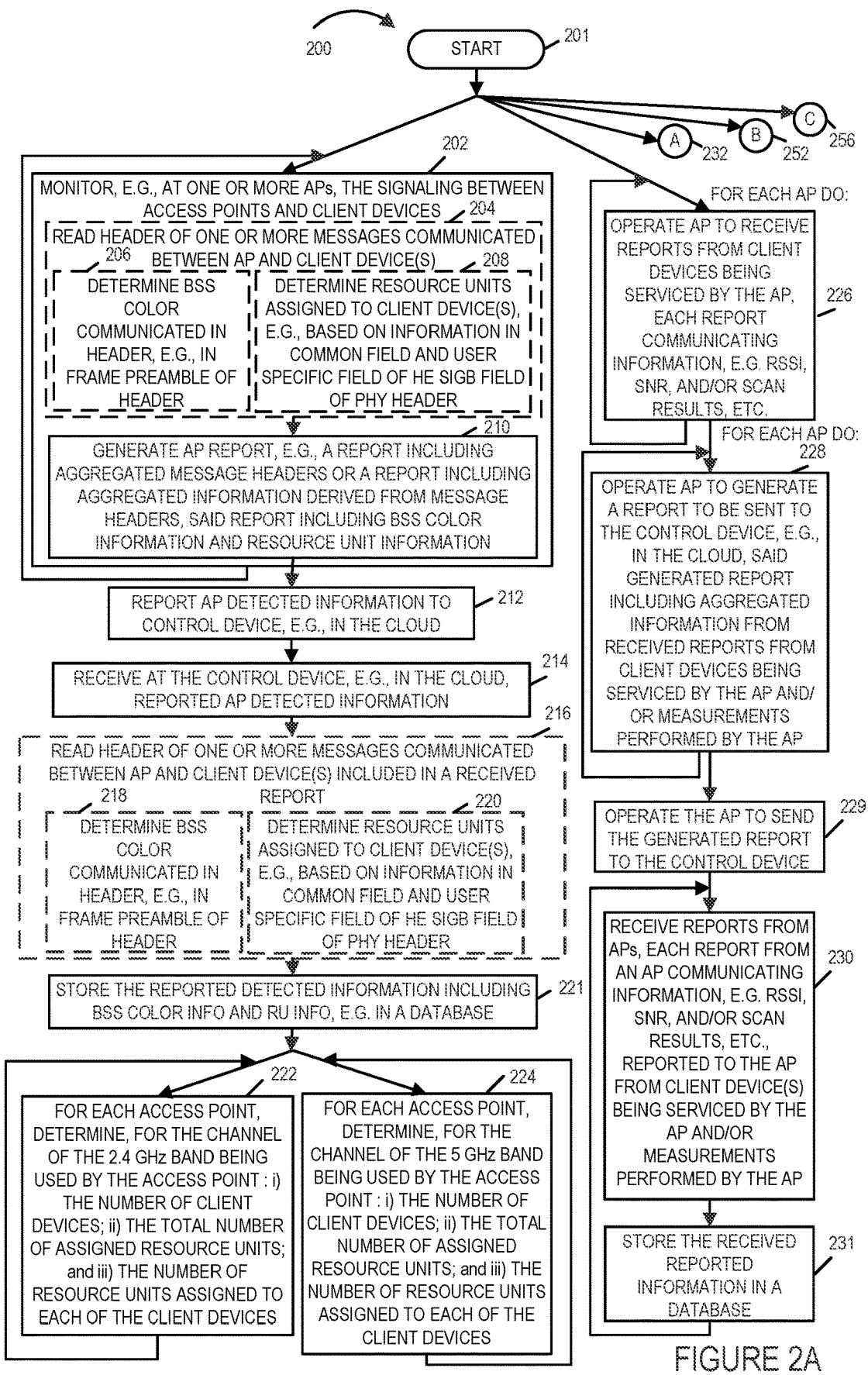

FIG. 2, comprising the combination of FIG. 2A and FIG. 2B, is a flowchart 200 of an exemplary method of controlling wireless resource utilization in accordance with an exemplary embodiment. Operation starts in step 201 in which the communications system, e.g., communications system 100 of FIG. 1, is powered on and initialized. Operation proceeds from start step 201 to step 202, step 226, step 234 via connecting node A 232, step 254 via connecting node B, and steps 258 and 260 via connecting node C 256.

In step 202 monitoring is performed, e.g., at one or more access points (APs) of the signaling between access point and client devices. In some embodiments, the monitoring is performed by and agent on the access point. In some embodiments, the monitoring of step 202 includes step 204 in which the header or one or more messages communicated between the AP and client device(s) is read. In some embodiments, step 204 includes step 206 in which the BSS color communicated in a header, e.g., in the frame preamble of the header is determined, e.g., by the agent of the AP. In some embodiments, step 204 includes step 208 in which resource units assigned to client device(s) are determined, e.g., by the agent of the AP, e.g., based on information in common field and user specific field of the HE SIG-B field of a PHY header.

Monitoring step 210 includes step 210 in which an AP report is generated, e.g. by the agent of the AP. For example, the generated report includes aggregated message headers from communicated messages between an AP and client devices and/or the report includes aggregated information derived, e.g. extracted, from message headers from communicated messages between and AP and client devices. In various embodiments, the generated report includes BSS color information and resource unit information. Step 202 is performed repetitively on an ongoing basis. Operation proceeds from step 210, for each generated report from an AP, to step 212.

In step 212 the AP reports the AP detected information, in the form of a generated report, to a control device, e.g., in the cloud, e.g., to management device/agent 102 in radio resource management cloud 106. For example in step 212 an agent on the AP sends the generated report to the control device. Operation proceeds from step 212 to step 214. In step 214 the control device, e.g., in the cloud, receives the reported AP detected information, e.g. in the form of a report. In some embodiments, e.g., an embodiment, in which the received report includes aggregated headers from messages communicated between the AP and the client devices, operation proceeds from step 214 to step 216. In step 216 the control device reads the header(s) of one or more messages communicated between AP and client device(s) which were included in the received report. Step 216 includes steps 218 and 220. In step 218 the control device determines BSS color communicated in a header, e.g. in a frame preamble of the header. In step 220 the control device determines resource units assigned to client device(s), e.g., based on information in a common field and user specific field(s) of an HE SIG-B field of a PHY header.

Operation proceeds from step 214 or step 216 to step 221 in which the control device stores the received reported detected information including BSS color information and resource unit information, e.g. in a database, e.g. cloud database 108. Operation proceeds from step 221 to steps 222 and 224, which are performed repetitively, on an ongoing basis.

In step 222, for each access points, the control device, determines for the channel of the 2.4 GHz band being used by the access point: i) the number of client devices; ii) the total number of assigned resource units; and iii) the number of resource units assigned to each of the client devices.

In step 224, for each access points, the control device, determines for the channel of the 5 GHz band being used by the access point: i) the number of client devices; ii) the total number of assigned resource units; and iii) the number of resource units assigned to each of the client devices.

Returning to step 226, which is performed by each AP, in step 226 the AP receives reports from client devices being services by the AP, each report communicating information, e.g., received signal strength indicator (RSSI) information, signal to noise ratio (SNR) information, and/or scan results, etc. to the AP. Operation proceeds from step 226 to step 228, which is performed by each AP. In step 228 the AP generates a report to be sent to the control device, e.g., in the cloud, said generated report including aggregated information from receives reports from client devices being serviced by the AP and/or measurements performed by the AP. In some embodiments, the generated report of step 228 is generated by an agent on the AP which interfaces with the control device, e.g. the control device in the cloud.

Operation proceeds from step 228 to step 229, in which the AP sends the generated report to the control device. Operation proceeds from step 229 to step 230. In step 230 the control device receives reports from APs, each report from an AP communicating information, e.g. RSSI, SNR, and/or scan results reported to the AP from client device(s) and/or measurements performed by the AP. Operation proceeds from step 230 to step 231 in which the control device stores the received report information in a database, e.g. a cloud database. Steps 230 and 231 are performed repetitively, e.g. on an ongoing basis.

Returning to step 234, in step 234 signaling is monitored, e.g., by access points, by the control device, and/or by the access points working in combination with the control device to detect a new client device. Step 234 is performed on an ongoing basis. Operation proceeds from step 234 to step 236, in response to a detected new client device, e.g., a client device which has just powered up is connecting to an access point in the system. In step 236 the control device performs an identification operation, e.g. the control device fingerprints the client device. Operation proceeds from step 236 to step 238. In step 238 the control device determines if the client device is known, e.g., based on comparing information received from the client device to information stored in a database of known client devices. If the client device is known, then operation proceeds from step 238 to step 240, in which the control device retrieves client device profile information. However, if the client device is not known, then operation proceeds from step 238 to step 242, in which the control device generates a new client device profile. Operation proceeds from step 240 or step 242 to step 244.

In step 244, the control device determines, based on the retrieved or newly generated client device profile, if the client device supports communications in both the 2.4 GHz band and the 5 GHz band. If the control device supports both the 2.4 GHz and 5 GHz bands, then operation proceeds from step 244 to step 246, in which the control device determines that the client device is a candidate for band steering. However, if the control device does not support both the 2.4 GHz and 5 GHz bands, e.g., the client device is a legacy device which only supports communications in the 2.4 GHz band, then operation proceeds from step 244 to step 248, in which the control device determines that the client device is not a candidate for band steering. Operation proceeds from step 246 or step 248 to step 250 in which the control device stores information indicating whether or not the client device is a candidate for band steering. In some embodiments, client devices which are determined to be candidates for band steering are placed on a list of client devices, for which information is processed to determine, e.g., repetitively, if the client device should be bandsteered or should remain on its current band.

Returning to step 254, in step 254, the control device calls a bandsteering routine. In some embodiments, the bandsteering routine is implemented in accordance with flowchart 300 of FIG. 3. Step 254 is performed for each client device, which has been determined to be a candidate for bandsteering. Step 254 is performed repetitively, on an ongoing basis.

Figures 3, 3A, 3B:
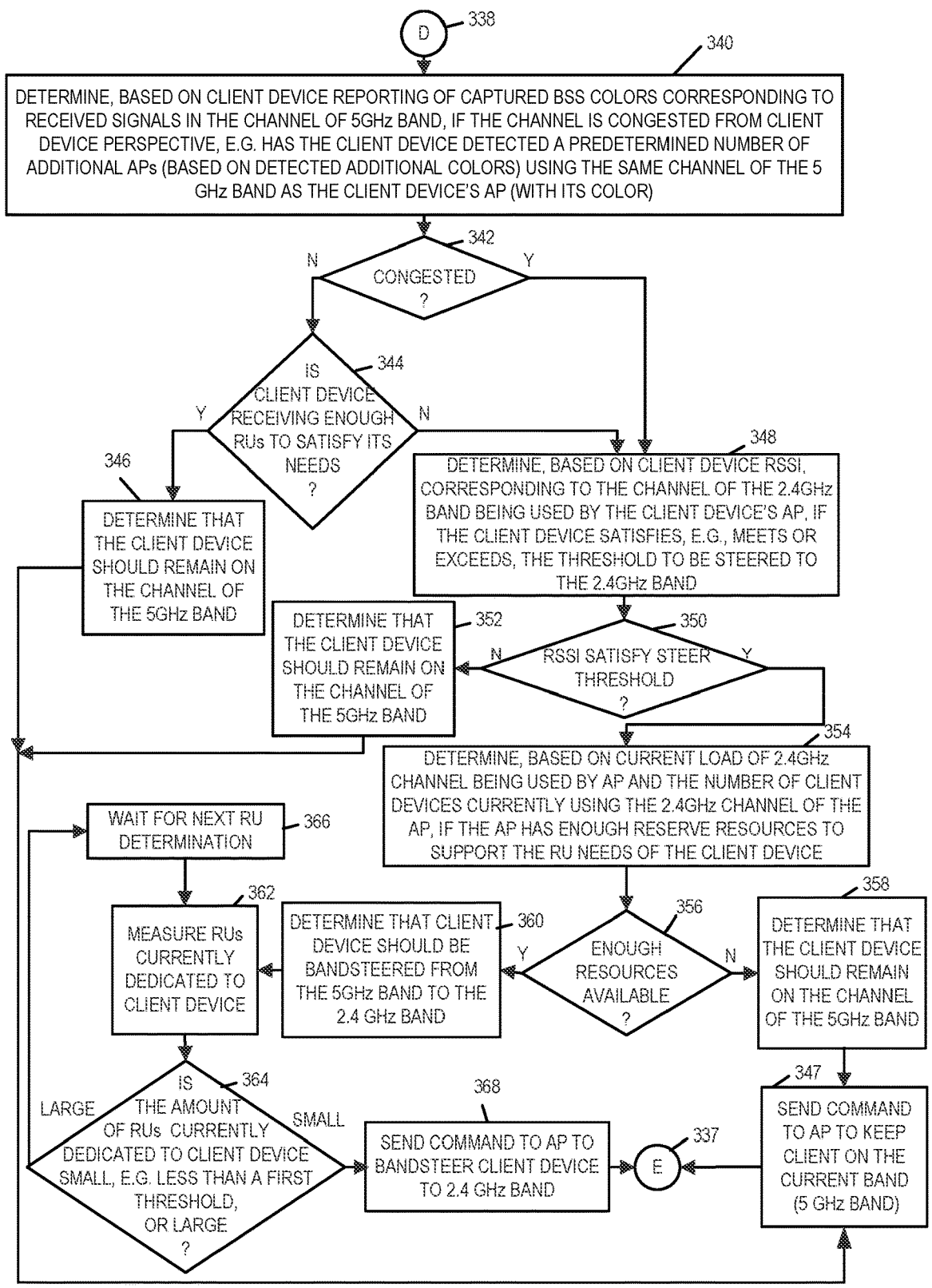
FIG. 3A is a first part of a flowchart of an exemplary method of bandsteering in accordance with an exemplary embodiment.
FIG. 3B is a second part of a flowchart of an exemplary method of bandsteering in accordance with an exemplary embodiment.
Figure 3A:
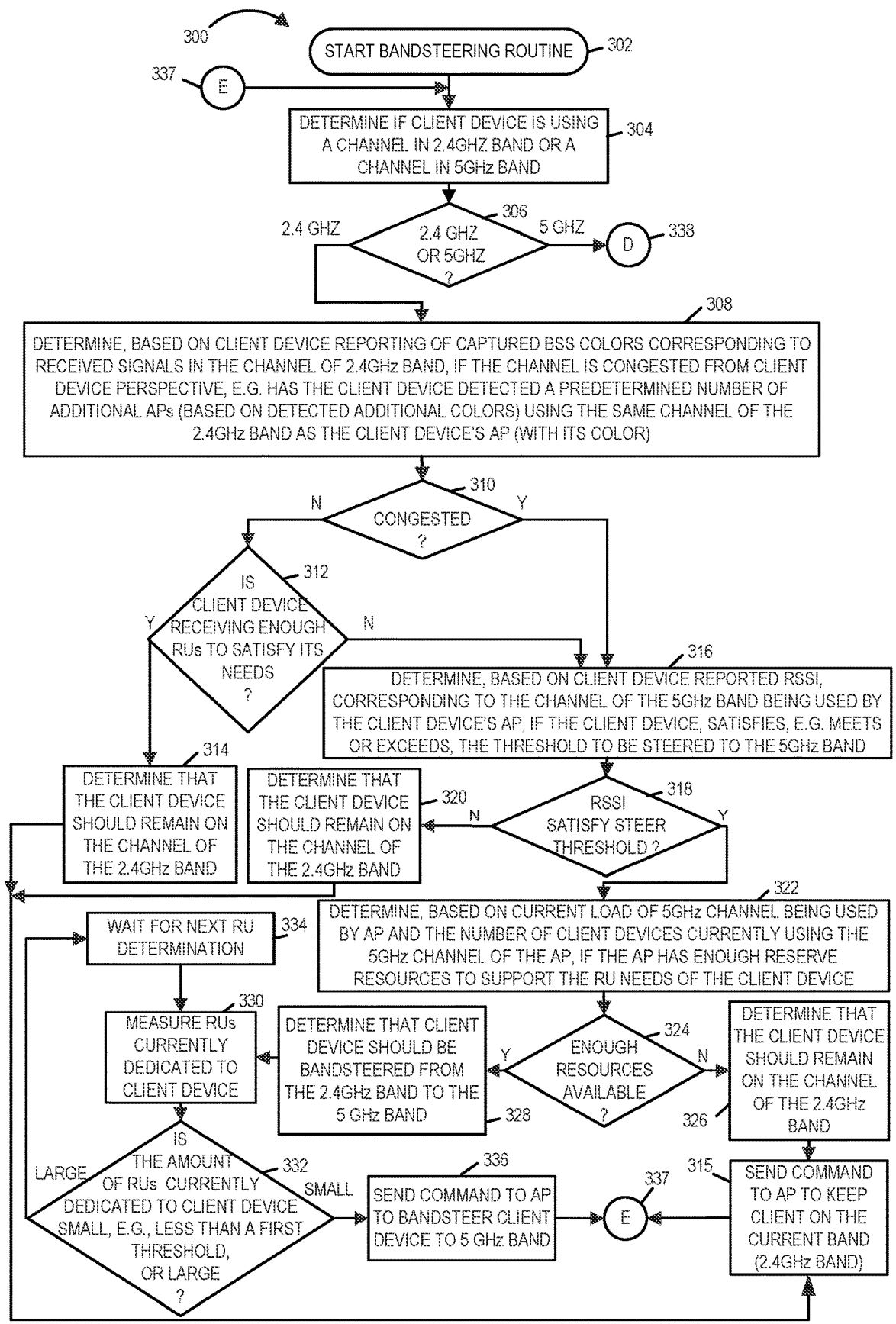

FIG. 3, comprising the combination of FIG. 3A and FIG. 3B, is a flowchart 300 of an exemplary method of bandsteering in accordance with an exemplary embodiment. Operation starts in initialization step 302 and proceeds to step 304. In step 304 the control device determined if the client device is using a channel in the 2.4 GHz band or the 5 GHz band. Operation proceeds from step 304 to step 306. In step 306, if the determination is that the client device is currently using a channel in the 2.4 GHz band, then operation proceeds from step 306 to step 308. However, in step 306, if the determination is that the client device is currently using a channel in the 5 GHz band, then operation proceeds from step 306, via connecting node D 338, to step 340 of FIG. 3B.

Retuning to step 308, in step 308 the control device determine, based on client device reporting of captured BSS colors corresponding to received signals in the channel of the 2.4 GHz band, if the channel is congested from the client device perspective, e.g. has the client device detected a predetermined number of additional APs (based on detected additional colors) using the same channel of the 2.4 GHz band as the client device's AP (with its color). Operation proceeds from step 308 to step 310. In step 310 if the determination is that the channel being used by the client device's AP in the 2.4 GHz band is not congested, then operation proceeds from step 310 to step 312. However, if the determination is that the channel being used by the client device's AP in the 2.4 GHz band is congested, then operation proceeds from step 310 to step 316.

Returning to step 312, in step 312 the control device determines if the client device is receiving enough resource units (RUs) to satisfy its needs. If the determination is that the client device is not receiving enough RUs to satisfy its needs then operation proceeds from step 312 to step 316. However, if the determination is that the client device is receiving enough RUs to satisfy its needs then operation proceeds from step 312 to step 314, in which the control device determines that the client device should remain on the channel of the 2.4 GHz band.

Returning to step 316, in step 316 the control device determines, based on the client device reported RSSI, corresponding to the channel of 5 GHz band being used by the client device's AP, if the client device satisfies, e.g. meets or exceeds, the threshold to be steered to the 5 GHz band. Operation proceeds from step 316 to step 318. In step 318, if the RSSI does not satisfy the steer threshold, then operation proceeds from step 318 to step 320, in which the control device determines that the client device should remain on the channel of the 2.4 GHz band. Alternatively, in step 318, if the RSSI satisfies the steer threshold, then operation proceeds from step t to step 322, in which the control device determines, based on the current load of the 5 GHz channel being used by the AP and the number of client devices currently using the 5 GHz channel of the AP, if the AP has enough reserve resources to support the RU needs of the client device. Operation proceeds from step 322 to step 324. In step 324 if the determination is that there are not enough resource available to support the RU needs of the client device, then operation proceeds from step 324 to step 326, in which the control device determines that the client device should remain on the channel of the 2.4 GHz band. Alternatively, in step 324 if the determination is that there are enough resource available to support the RU needs of the client device, then operation proceeds from step 324 to step 328, in which the control device determines that the client device should be bandsteered from the 2.4 GHz band to the 5 GHz band. Operation proceeds from step 328 to step 330, in which the control device measures the RUs currently dedicated to the client device. Operation proceeds from step 330 to step 332. In step 332 the control device determines if the amount of RUs currently dedicated to the client device is small, e.g. less than a first threshold, or large, e.g., greater than or equal to the first threshold. If the determination of step 332 is that the amount of resources currently dedicated to the client device is large, then operation proceeds from step 332 to step 334, in which the control device waits for the next RU determination, and then operation proceeds from step 334 to step 330.

However, if the determination of step 332 is that the amount of resources currently dedicated to the client device is small, then operation proceeds from step 332 to step 336, in which the control device sends a command to the client's AP to bandsteer the client device to the 5 GHz band.

Operation proceeds from step 314, 320, or step 326 to step 315, in which the control device sends a command to the client's AP to keep the client device on the current band that is using, which is the 2.4 GHz band. Operation proceeds from step 336 or 315 to step 304, via connecting node E 337.

Retuning to step 340, in step 340 the control device determine, based on client device reporting of captured BSS colors corresponding to received signals in the channel of the 5 GHz band, if the channel is congested from the client device perspective, e.g. has the client device detected a predetermined number of additional APs (based on detected additional colors) using the same channel of the 5 GHz band as the client device's AP (with its color). Operation proceeds from step 340 to step 342. In step 342 if the determination is that the channel being used by the client device's AP in the 5 GHz band is not congested, then operation proceeds from step 342 to step 344. However, if the determination is that the channel being used by the client device's AP in the 5 GHz band is congested, then operation proceeds from step 342 to step 348.

Returning to step 344, in step 344 the control device determines if the client device is receiving enough resource units (RUs) to satisfy its needs. If the determination is that the client device is not receiving enough RUs to satisfy its needs then operation proceeds from step 344 to step 348. However, if the determination is that the client device is receiving enough RUs to satisfy its needs then operation proceeds from step 344 to step 346, in which the control device determines that the client device should remain on the channel of the 5 GHz band.

Returning to step 348, in step 348 the control device determines, based on the client device reported RSSI, corresponding to the channel of 2.4 GHz band being used by the client device's AP, if the client device satisfies, e.g., meets or exceeds, the threshold to be steered to the 2.4 GHz band. Operation proceeds from step 348 to step 350. In step 350, if the RSSI does not satisfy the steer threshold, then operation proceeds from step 350 to step 352, in which the control device determines that the client device should remain on the channel of the 5 GHz band. Alternatively, in step 350, if the RSSI satisfies the steer threshold, then operation proceeds from step 350 to step 354, in which the control device determines, based on the current load of the 2.4 GHz channel being used by the AP and the number of client devices currently using the 2.4 GHz channel of the AP, if the AP has enough reserve resources to support the RU needs of the client device. Operation proceeds from step 354 to step 356. In step 356 if the determination is that there are not enough resource available to support the RU needs of the client device, then operation proceeds from step 356 to step 358, in which the control device determines that the client device should remain on the channel of the 5 GHz band. Alternatively, in step 356 if the determination is that there are enough resource available to support the RU needs of the client device, then operation proceeds from step 356 to step 360, in which the control device determines that the client device should be bandsteered from the 5 GHz band to the 2.4 GHz band. Operation proceeds from step 360 to step 362, in which the control device measures the RUs currently dedicated to the client device. Operation proceeds from step 362 to step 364. In step 364 the control device determines if the amount of RUs currently dedicated to the client device is small, e.g. less than a first threshold, or large, e.g., greater than or equal to the first threshold. If the determination of step 364 is that the amount of resources currently dedicated to the client device is large, then operation proceeds from step 364 to step 366, in which the control device waits for the next RU determination, and then operation proceeds from step 366 to step 362 for another measurement of RUs currently dedicated to the client device.

However, if the determination of step 364 is that the amount of resources currently dedicated to the client device is small, then operation proceeds from step 364 to step 368, in which the control device sends a command to the client's AP to bandsteer the client device to the 2.4 GHz band.

Operation proceeds from step 346, 352, or step 358 to step 347, in which the control device sends a command to the client's AP to keep the client device on the current band that is using, which is the 5 GHz band. Operation proceeds from step 368 or 347 to step 304, via connecting node E 337.

Returning to step 258, in step 258, the control device calls a channel change routine for determining and/or implementing a channel change for an AP with regard to the 2.4 GHz band. Step 254 is performed for each AP repetitively, on an ongoing basis. In some embodiments, the channel change routine of step 258 is implemented in accordance with flowchart 400 of FIG. 4.

Returning to step 260, in step 260, the control device calls a channel change routine for determining and/or implementing a channel change for an AP with regard to the 5 GHz band. Step 260 is performed for each AP repetitively, on an ongoing basis. In some embodiments, the channel change routine of step 260 is implemented in accordance with flowchart 400 of FIG. 4.

Figure 4:
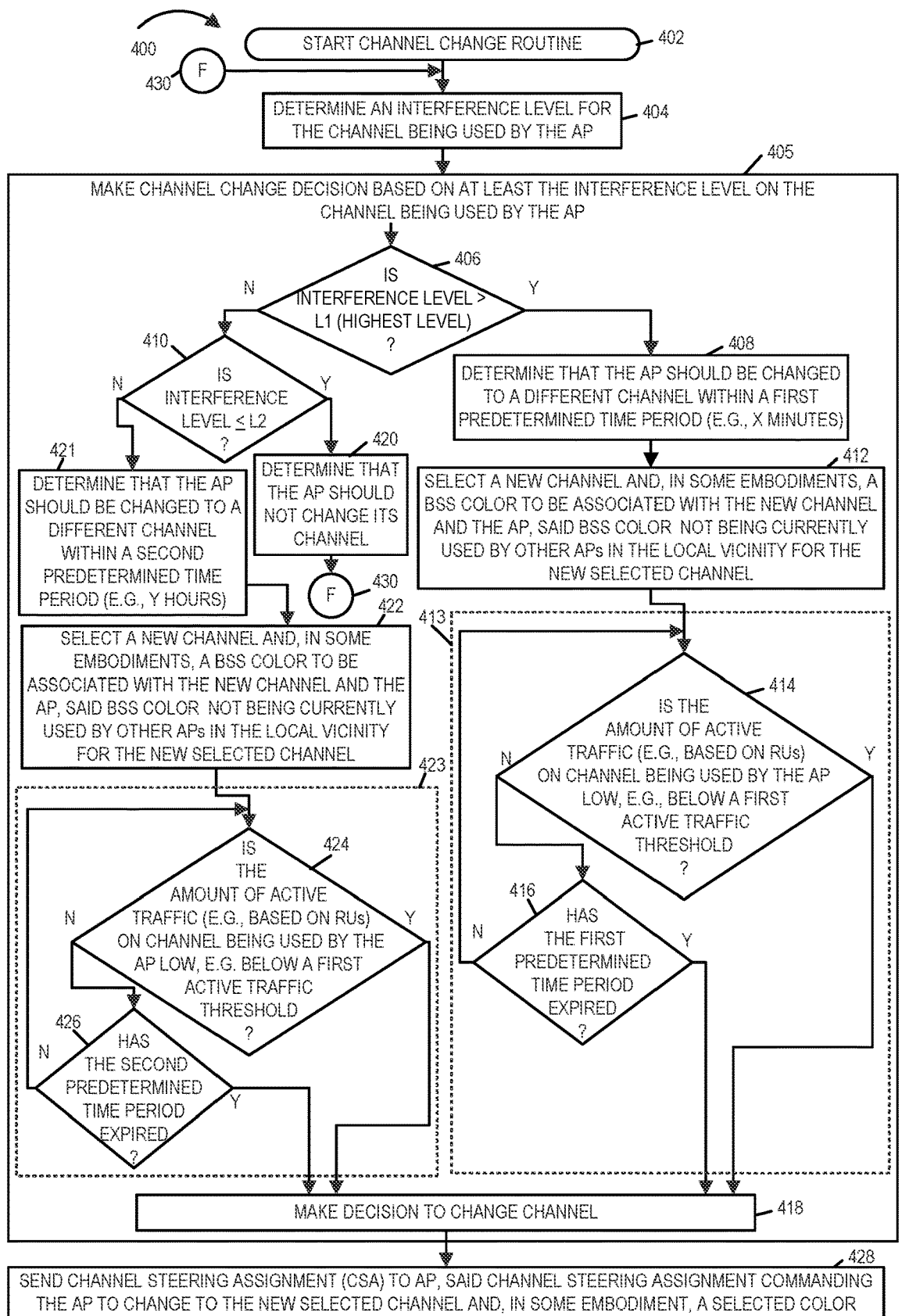
FIG. 4 is a flowchart of an exemplary method of determining and implementing channel change in accordance with an exemplary embodiment.

FIG. 4 is a flowchart 400 of an exemplary method of a channel change routine in accordance with an exemplary embodiment. Operation starts in start step 402 and proceeds to step 404. In step 402 the control device determines an interference level for the channel being used by the AP. Operation proceeds from step 404 to step 405. In step 405 the control device makes a channel change decision based on at least the interference level on the channel being used by the AP. Step 405 includes steps 406, 408, 410, 412, 414, 416, 418, 420, 422, 424, and 426.

In step 406, the control device determines if the determined level of interference for the channel being used by AP is greater than level L1 (highest level). If the determined level of interference is less than or equal to level L1, then operation proceeds from step 406 to step 410. However, if the determined level of interference is greater than L1, then operation proceeds from step 406 to step 408. In step 408 the control device determines that the AP should be changed to a different channel within a first predetermined time period, e.g. X minutes. Operation proceeds from step 408 to step 412, in which the control device selects a new channel, and in some embodiments, a BSS color to be associated with the new channel, said selected BSS color not being currently used by other APs in the local vicinity for the new selected channel. Operation proceeds from step 412 to step 414.

In step 414 the control device determines if the amount of active traffic (e.g., based on RUs) on the channel being used by the AP is low, e.g., below a first active traffic threshold. If the determination is that the amount of active traffic on the channel being used by the AP is low (below a first active traffic threshold), then operation proceeds from step 414 to step 418, in which the control device makes a decision to change channel. However, if the determination is that the amount of active traffic on the channel threshold is not low (greater than or equal to the first active traffic threshold), then operation proceeds from step 414 to step 416. In step 416, the control device determines if the first predetermined time period has expired. If the determination is that the first predetermined time period has not expired, then operation proceeds from step 416 to step 414 for another evaluation of the amount of active traffic relative to the first active traffic threshold at a later point in time. However, if the determination of step 416 is that the first predetermined time period has expired, then operation proceeds from step 416 to step 418, in which the control device makes a decision to change channel. Step 414 and 416, in some embodiments, is considered to be part of step 413, in which the control device waits to send the channel steering assignment until i) the amount of active traffic on the first channel is below the first active traffic or ii) a first amount of time has expired from when said channel change decision (step 408) was made.

Returning to step 410, in step 410 the control device determines if the determined interference of step 404 is less than of equal to threshold level L2, where level L2 is less than level L1. If the determination of step 410 is that the interference level is less than or equal to L2, then the determined level of interference is a low level of interference and operation proceeds from step 410 to step 420, in which the control device determines that the AP should not change its channel. Operation proceeds from step 420, via connecting node F 430 to step 404.

However, if the determination of step 410 is that the interference level is not less than or equal to L2, then the determined level of interference is greater than L2 and less than or equal to L1, and is an intermediate level of interference and operation proceeds from step 410 to step 421, in which the control device determines that the AP should be changed to an different channel within a second predetermined time period (e.g. Y hours). Operation proceeds from step 421 to step 422, in which the control device selects a new channel, and in some embodiments, a BSS color to be associated with the new channel, said selected BSS color not being currently used by other APs in the local vicinity for the new selected channel. Operation proceeds from step 422 to step 424.

In step 424 the control device determines if the amount of active traffic (e.g., based on RUs) on the channel being used by the AP is low, e.g., below a first active traffic threshold. If the determination is that the amount of active traffic on the channel being used by the AP is low (below a first active traffic threshold), then operation proceeds from step 424 to step 418, in which the control device makes a decision to change channel. However, if the determination is that the amount of active traffic on the channel threshold is not low (greater than or equal to the first active traffic threshold), then operation proceeds from step 424 to step 426. In step 426, the control device determines if the second predetermined time period has expired. If the determination is that the second predetermined time period has not expired, then operation proceeds from step 426 to step 424 for another evaluation of the amount of active traffic relative to the first active traffic threshold at a later point in time. However, if the determination of step 426 is that the second predetermined time period has expired, then operation proceeds from step 426 to step 418, in which the control device makes a decision to change channel. Step 424 and 426, in some embodiments, are considered to be part of step 423, in which the control device waits to send the channel steering assignment until i) the amount of active traffic on the first channel is below the first active traffic or ii) a second amount of time has expired from when said channel change decision (step 421) was made.

Operation proceeds from step 418 to step 428, in which the control device sends a channel steering assignment (CSA) to the AP, said channel steering assignment commanding the AP to change to the new selected channel, and in some embodiments, a selected color. Operation proceeds from step 428, via connecting node F 430, to step 404.

In some embodiments, the control device makes the decision as to whether or not a client should be bandsteered and communicates the decision to the AP, which is servicing the client device, but the final timing of when to bandsteer the client device is left to the AP to decide, e.g. based on the APs perspective as to how to cause minimal disruption.

In some embodiments, the control device makes the decision as to whether or not access point should perform a channel change and communicates the decision to the AP, but the final timing of when to change the client device is left to the AP to decide, e.g. based on the APs perspective as to how to cause minimal disruption. For example steps 413 and 423 may be performed, in some embodiments, with step 428 being performed following step 412 or 422 and prior to steps 413 and 423.

Figure 5:
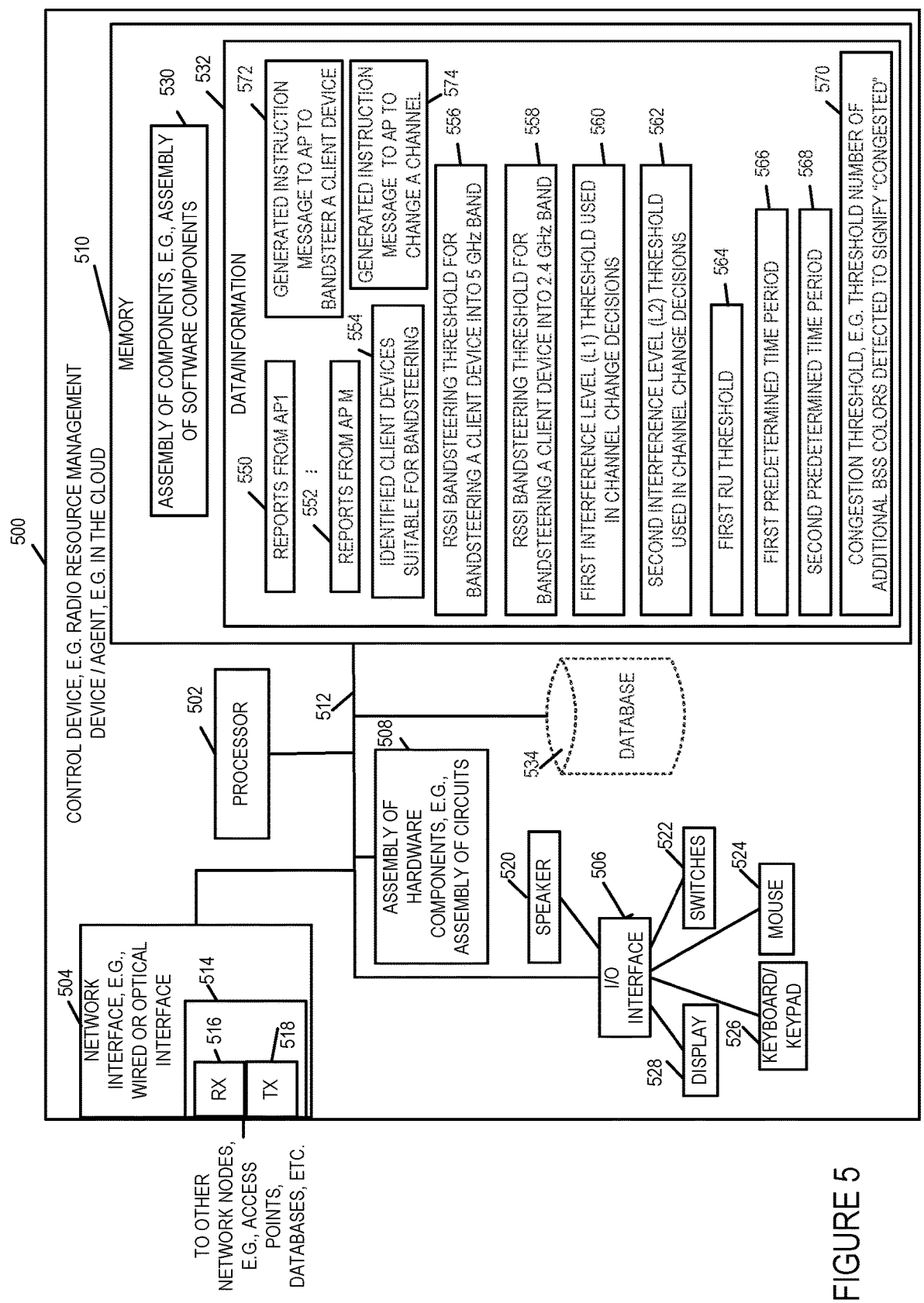
FIG. 5 is a drawing of a control device, e.g., a radio resource management device/agent in accordance with an exemplary embodiment.

FIG. 5 is a drawing of an exemplary control device 500, e.g. a radio resource management (RRM) device/agent in accordance with an exemplary embodiment. Exemplary control device 500 is, e.g., management device/agent 102 of system 100 of FIG. 1. Exemplary control device 500 implements steps of one or more exemplary methods, e.g., the steps of the methods of flowchart 200 of FIG. 2, flowchart 300 of FIG. 3 and/or flowchart 400 of FIG. 4. In various embodiments, exemplary control device 500 interacts with agents, e.g., resource management agents, located on the access points.

Exemplary control device 500 includes a processor 502, e.g. a CPU, a network interface 504, e.g., a wired or optical interface, an I/O interface 506, an assembly of hardware components 508, e.g., an assembly of circuits, and a memory 510 coupled together via a bus 512 over which the various elements may interchange data and information. Control device 500 further includes a plurality of I/O devices (speaker 520, switches 522, mouse 524, keyboard/keypad 526, and display 528, coupled to I/O interface 506, via which the I/O devices may communicate with other elements in the control device 500. In some embodiments, control device 500 includes a database 534 coupled to bus 512. In some embodiments, database 534 is included as part of memory 510.

Memory 510 includes an assembly of components 530, e.g., an assembly of software components, and data/information 532. Network interface 504 includes a receiver 516 and transmitter 518. In some embodiments receiver 516 and transmitter 518 are includes as part of a transceiver 614. The network interface couples the control device 500 to other network nodes, e.g., access points, databases, etc, a network, and/or the Internet.

Data/information 532 includes a plurality of reports from access points (report from AP1 550, . . . , report from AP M 552), a list of identified client device which are suitable candidates for bandsteering 554, a RSSI bandsteering threshold for bandsteering a client device into a 5 GHz band 556, a RSSI bandsteering threshold for bandsteering a client device into a 2.4 GHz band 558, a first interference level (L1) threshold used in channel change decisions 560, a second interference level (L2) used in channel change decisions 562, a first resource unit (RU) threshold 564, e.g., for distinguishing between a small amount of allocated resources and a large amount of allocated resources, a first predetermined time period 566, e.g., indicating a maximum amount of wait time before making a channel change when the interference level is high and a decision has been made to make a channel change, a second predetermined time period 568, e.g., indicating a maximum amount of wait time before making a channel change when the interference level is intermediate and a decision has been made to make a channel change, a congestion threshold 570, e.g. a threshold number of additional BSS colors detected to signify "congested", e.g. a value of 2. In some embodiments, individual RSSI bandsteering thresholds are determined for a client device, e.g., as a function of power level being used. Data/information 532 further includes a generated instruction message 572 to be sent to an AP to instruct the AP to bandsteer a particular client device, and a generated instruction message 574 to be sent to an AP to command the AP to change a channel on one of its bands optionally including a selected new channel and, in some embodiments, a selected BSS color to be used.

Figure 6:
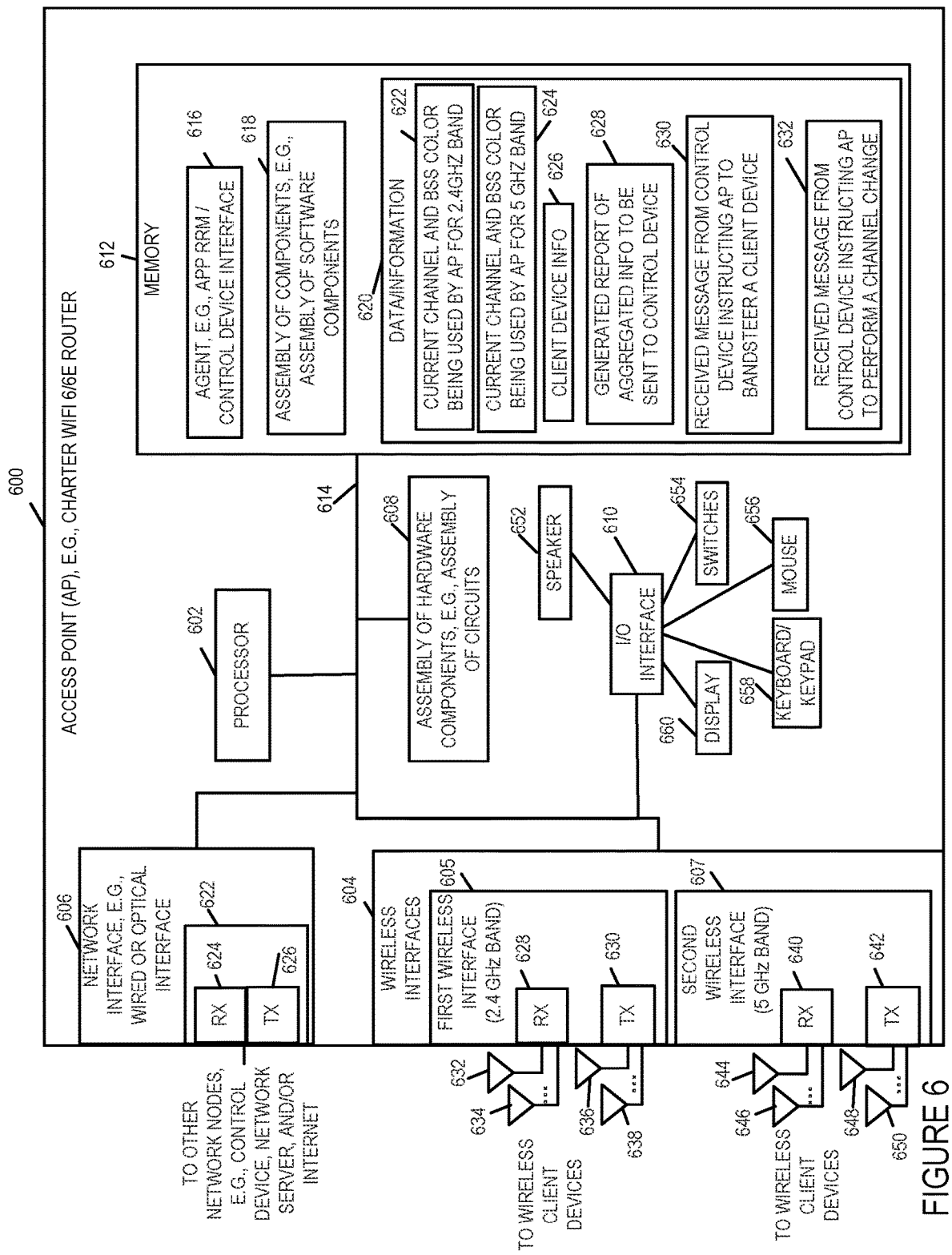
FIG. 6 is a drawing of an exemplary access point, e.g. a Charter WiFi 6/6E router, in accordance with an exemplary embodiment.
Figure 7A:
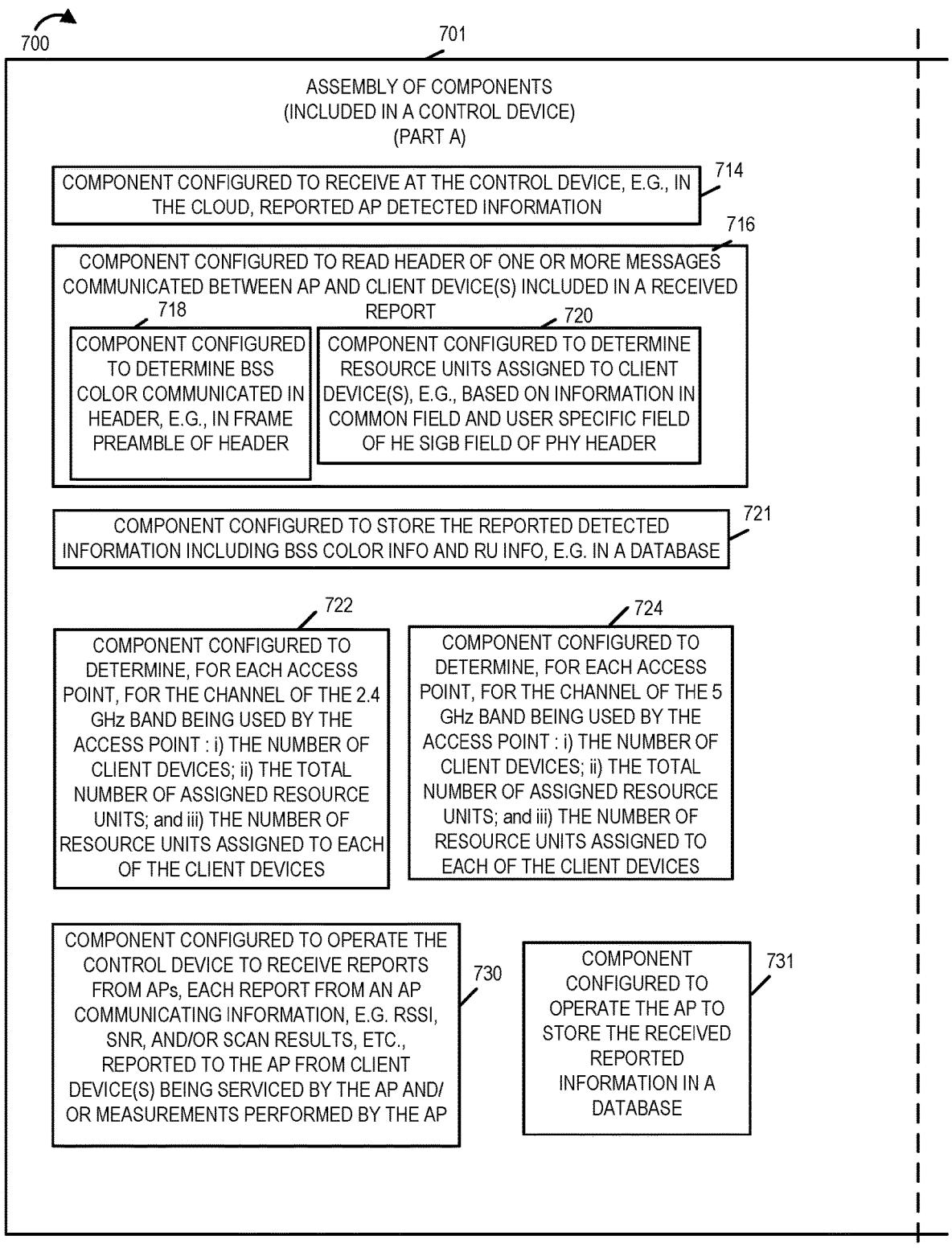
FIG. 7A is a first part of an exemplary assembly of components which may be including in a control device in accordance with an exemplary embodiment.
Figure 7B:
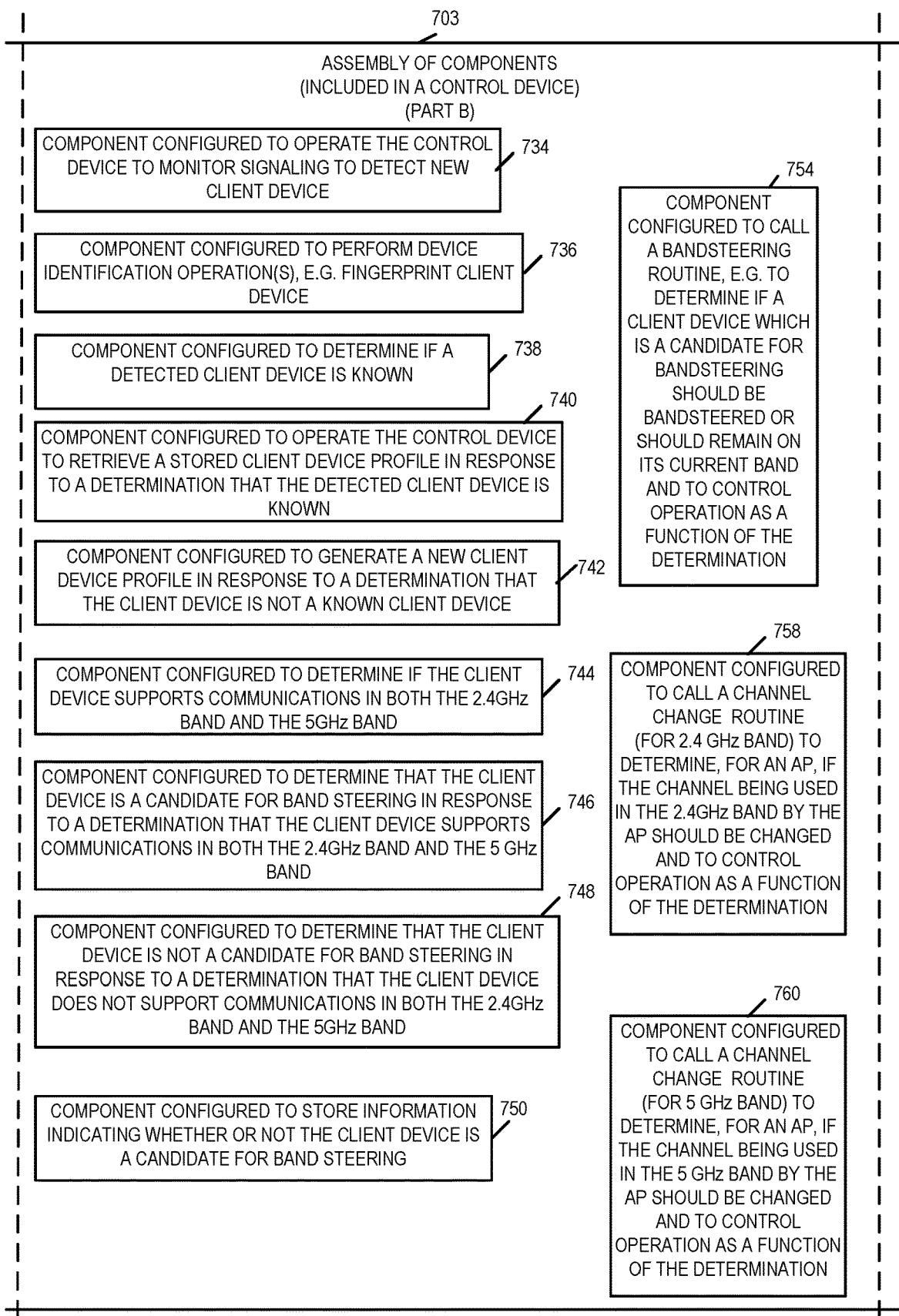
FIG. 7B is a second part of an exemplary assembly of components which may be included in a control device in accordance with an exemplary embodiment.
Figure 7C:
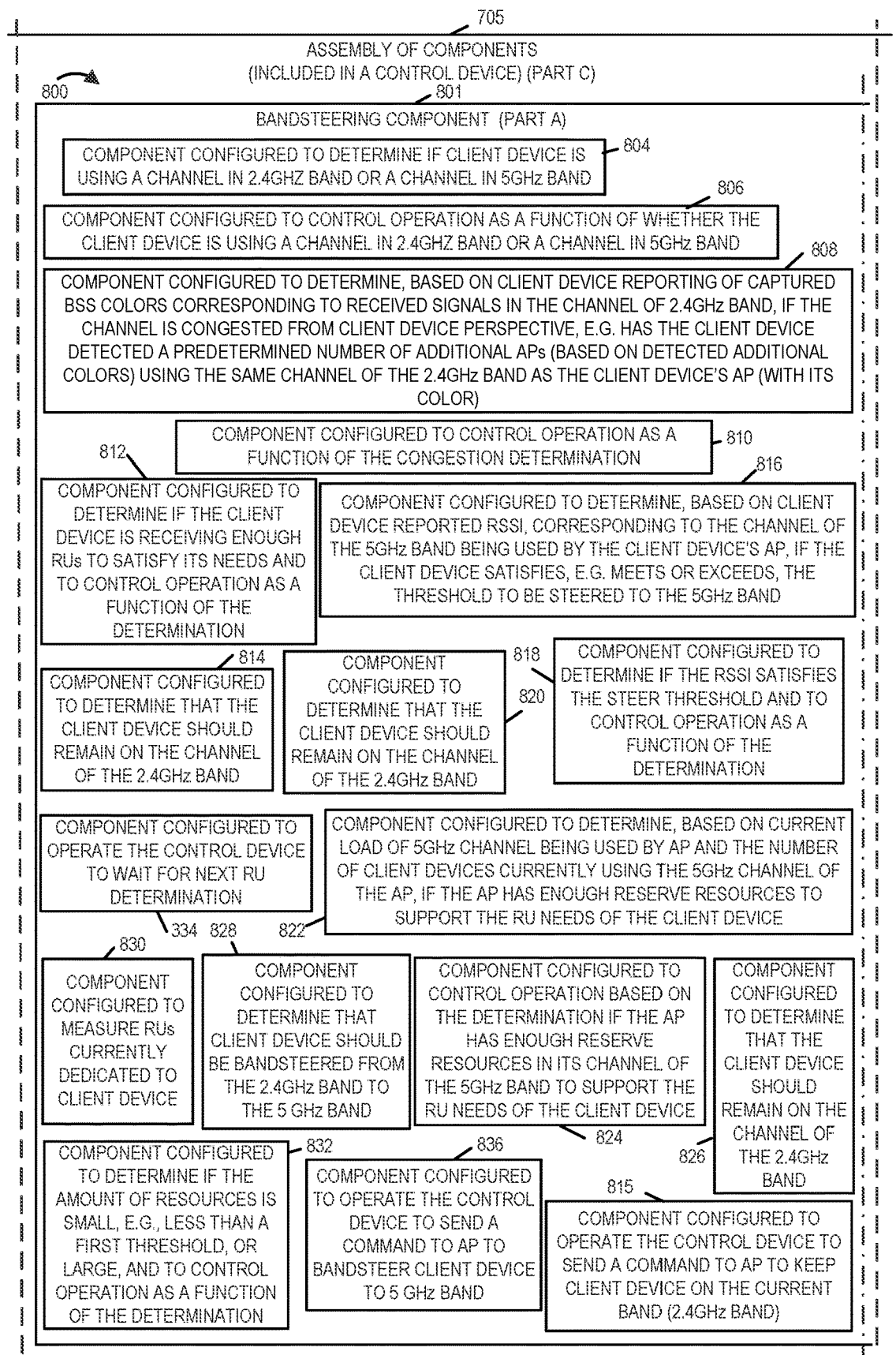
FIG. 7C is a third part of an exemplary assembly of components which may be included in a control device in accordance with an exemplary embodiment.
Figure 7D:
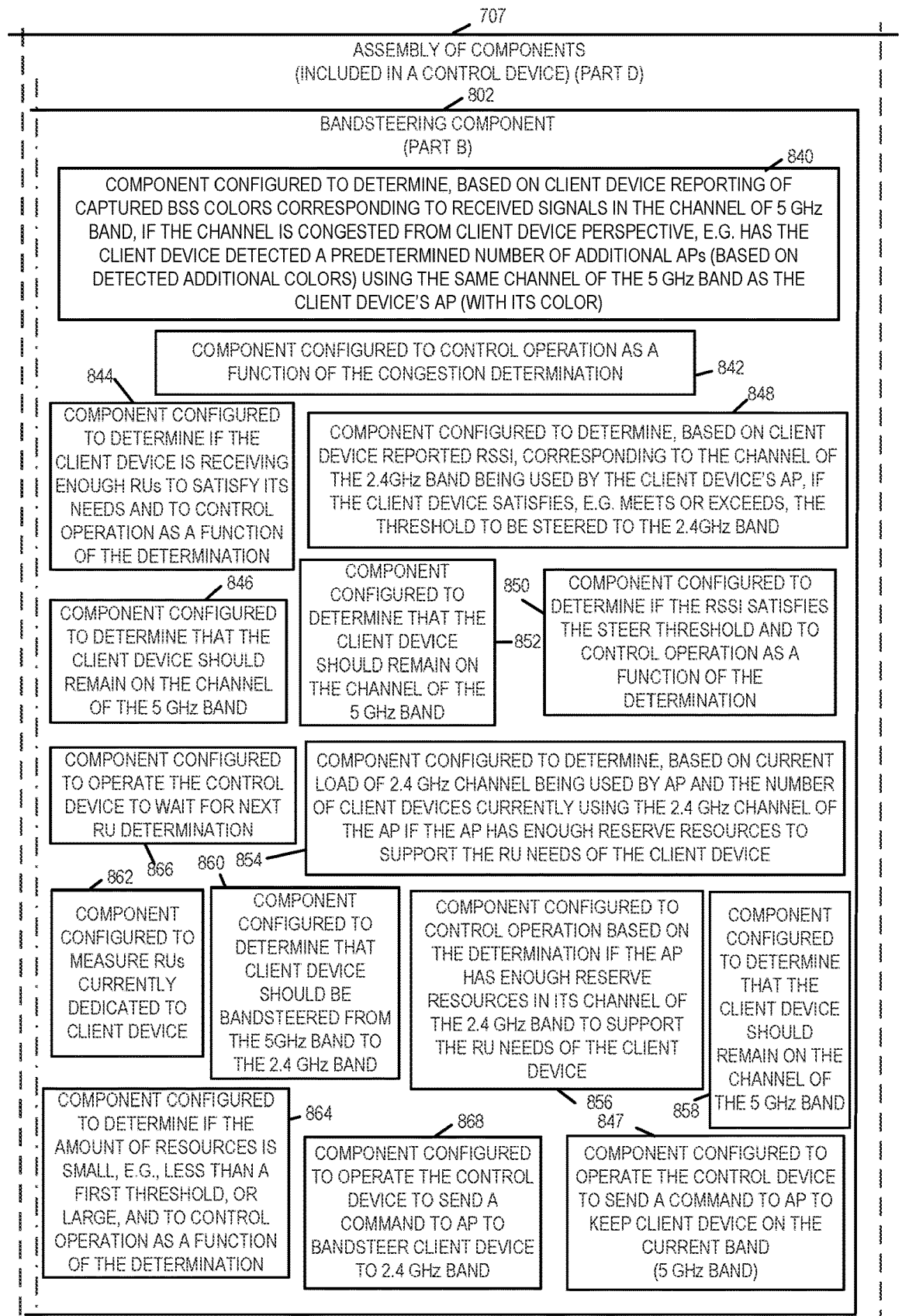
FIG. 7D is a fourth part of an exemplary assembly of components which may be included in a control device in accordance with an exemplary embodiment.
Figure 7E:
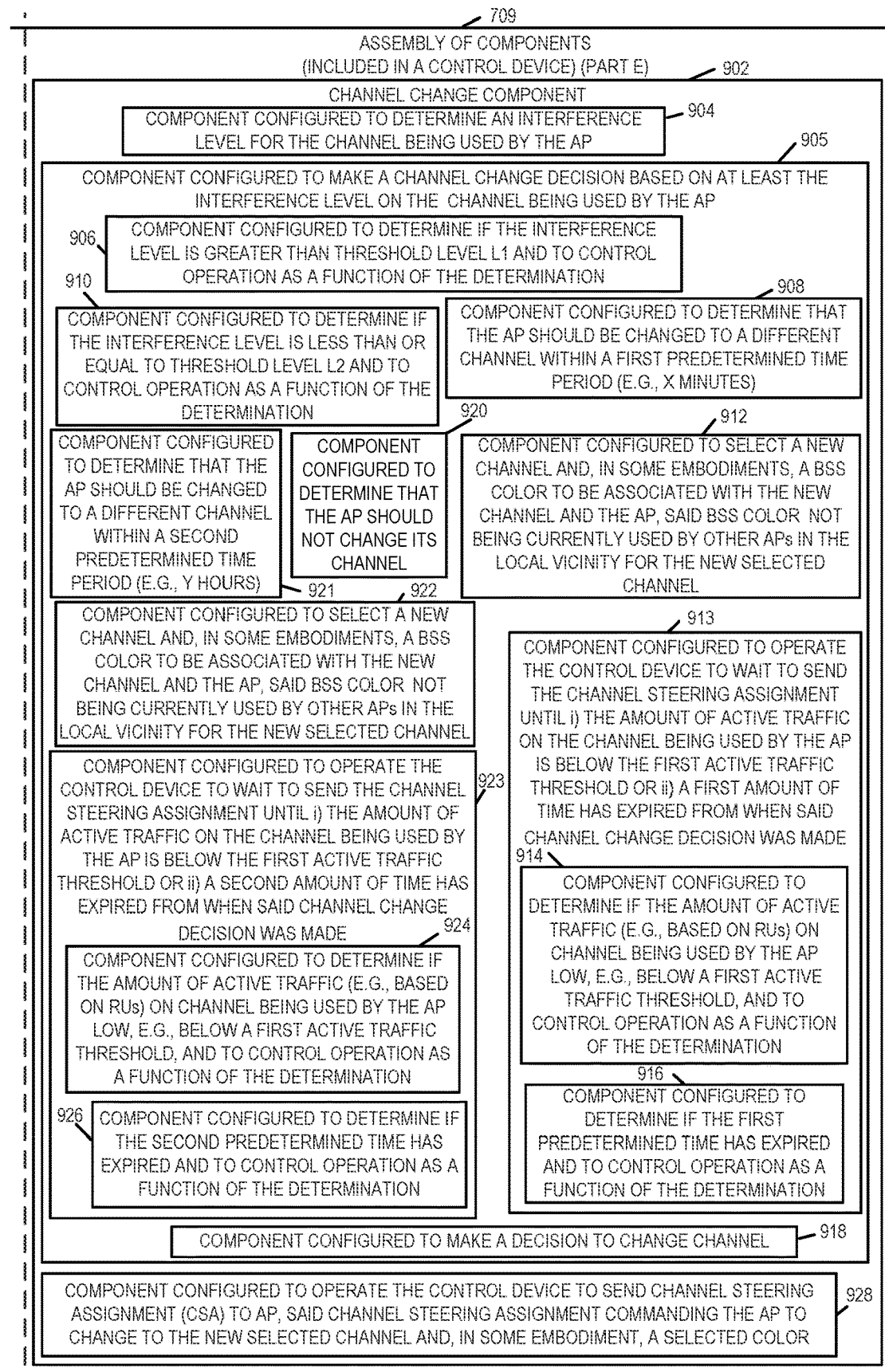
FIG. 7E is a fifth part of an exemplary assembly of components which may be included in a control device in accordance with an exemplary embodiment.

FIG. 6 is a drawing of an exemplary access point 600, e.g., a WiFi 6/6E router, implemented with features in accordance with an exemplary embodiment. Exemplary access point 600 is, e.g. any of the service provider access point (service provider access point 1 112, . . . , service provider access point M 114) of system 100 of FIG. 1. Exemplary access point 600 implements steps of one or more exemplary methods, e.g., the steps of the methods of flowchart 200 of FIG. 2, flowchart 300 of FIG. 3 and/or flowchart 400 of FIG. 4. In various embodiments, exemplary access point 600 interacts with a control device, e.g. a RRC management device/agent, via agent 616.

Exemplary access point 600 includes a processor 602, e.g. a CPU, wireless interfaces 604, a network interface 606, e.g., a wired or optical interface, an assembly of hardware components 608, e.g., an assembly of circuits, an I/O interface 610, and a memory 612 coupled together via a bus 614 over which the various elements may interchange data and information. Access point 600 further includes a plurality of I/O devices (speaker 652, switches 654, mouse 656, keyboard/keypad 658, and display 660, coupled to I/O interface 610, via which the I/O devices may communicate with other elements in the access point 600.

Memory 612 includes an agent 616, e.g., an application (APP) for radio resource management (RRM) control device interfacing, an assembly of components 618, e.g., an assembly of software components, and data/information 620. Data/information 620 includes information identifying a current channel and BSS color being used by the AP for the 2.4 GHz band 622, information identifying a current channel and BSS color being used by the AP for the 5 GHz band 624, client device information 626, e.g. including captured headers of messages (including RU information and BSS color information) being communicated between the AP and the client device for each client device, received reports, e.g., RSSI reports, interference reports, collision reports, SNR reports, scan reports, etc. from the client device, power information relating to the client devices, etc., a generated report of aggregated information to be sent to the control device 628, a received message 630 from the control device instructing the AP to bandsteer a particular client device, and a received message 632 from the client device instructing the AP to perform a channel change.

Wireless interfaces 604 includes a first wireless interface 605, e.g., a 2.4 GHz band wireless interface, and a second wireless interface 607, e.g. a 5 GHz band wireless interface. First wireless interface 605 includes a receiver 628 coupled to a plurality of antennas or antenna elements (632, . . . 634), via which the access point 600 may receive wireless signal from wireless client devices operating in the 2.4 GHz band. First wireless interface 605 further includes a transmitter 630 coupled to a plurality of antennas or antenna elements (636, . . . 638), via which the access point 600 may transmit wireless signal to wireless client devices operating in the 2.4 GHz band. Second wireless interface 607 includes a receiver 640 coupled to a plurality of antennas or antenna elements (644, . . . 646), via which the access point 600 may receive wireless signal from wireless client devices operating in the 5 GHz band. Second wireless interface 607 further includes a transmitter 642 coupled to a plurality of antennas or antenna elements (648, . . . , 650), via which the access point 600 may transmit wireless signal to wireless client devices operating in the 5 GHz band.

Network interface 606 includes a receiver 624 and a transmitter 626. In some embodiments receiver 624 and transmitter 626 are includes as part of a transceiver 622. The network interface 606 couples the access point 600 to other network nodes, e.g., a control device such as a management device for managing radio resources, a network server, etc., a network, and/or the Internet.

FIG. 7, comprising the combination of FIG. 7A, FIG. 7B, FIG. 7C, FIG. 7D and FIG. 7E, is a drawing of an exemplary assembly of components 700, comprising Part A 701, Part B 703, Part C 705, Part D 707 and Part E 709, which may be included an exemplary control device in accordance with an exemplary embodiment, e.g., control device 102 of system 100 of FIG. 1 and/or control device 500 of FIG. 5.

The components in the assembly of components 700 can be, and in some embodiments are, implemented fully in hardware within the processor 502, e.g., as individual circuits. The components in the assembly of components 700 can, and in some embodiments are, implemented fully in hardware within the assembly of hardware components 508, e.g., as individual circuits corresponding to the different components. In other embodiments some of the components are implemented, e.g., as circuits, within the processor 502 with other components being implemented, e.g., as circuits within assembly of components 508, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 510 of the control device 500, with the components controlling operation of the control device to implement the functions corresponding to the components when the components are executed by a processor, e.g., processor 502. In some such embodiments, the assembly of components 700 is included in the memory 510 as assembly of software components 530. In still other embodiments, various components in assembly of components 700 are implemented as a combination of hardware and software, e.g., with another circuit external to the processor providing input to the processor 502 which then under software control operates to perform a portion of a component's function. While processor 502 is shown in the FIG. 5 embodiment as a single processor, e.g., computer, it should be appreciated that the processor 502 may be implemented as one or more processors, e.g., computers.

When implemented in software the components include code, which when executed by the processor 502, configure the processor 502 to implement the function corresponding to the component. In embodiments where the assembly of components 700 is stored in the memory 510, the memory 510 is a computer program product comprising a computer readable medium comprising code, e.g., individual code for each component, for causing at least one computer, e.g., processor 502, to implement the functions to which the components correspond. Completely hardware based or completely software based components may be used. However, it should be appreciated that any combination of software and hardware, e.g., circuit implemented components may be used to implement the functions. As should be appreciated, the components illustrated in FIG. 7 control and/or configure the control device 500, or elements therein such as the processor 502, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method, e.g., steps of the method of flowchart 200 of FIG. 2, steps of the method of flowchart 300 of FIG. 3 and/or steps of the method of flowchart 400 of FIG. 4 and/or described or shown with respect to any of the other figures.

Assembly of components 700 includes a component 714 configured to receive at the control device reported AP detected information e.g., aggregated headers from communications between AP(s) and client device(s) and/or aggregated information derived from headers of communications between AP(s) and client devices, a component 716 configured to read headers of one or more messages communicated between an AP and client device(s), said headers being included in a received report. Component 716 includes a component 718 configured to determined BSS color communicated in a header, e.g., in frame preamble of a header, and a component 720 configured to determine resource units assigned to client device(s), e.g. based on information in common field and one or more user specific fields of HE SIG-B field of a PHY header. Assembly of components 700 further includes a component 721 configured to store the reported detected including BSS color information and RU information, e.g., in a database. The database may be included as part of the control device or may be coupled to the control device. Assembly of components 700 further includes a component 722 configured to determine, for each access point, for the channel of the 2.4 GHz band being used by the access point: i) the number of client devices, ii) the total number of assigned resource units; and iii) the number of resource units assigned to each of the client devices, a component 724 configured to determine, for each access point, for the channel of the 5 GHz band being used by the access point: i) the number of client devices, ii) the total number of assigned resource units; and iii) the number of resource units assigned to each of the client devices, a component 730 configured to operate the control device to receive reports from APs, each report from an AP communicating information, e.g. RSSI, SNR, and/or scan results, etc., reported to the AP from client device(s) being serviced by the AP and/or measurement performed by the AP, and a component 731 configured to operate the AP to store the received reported information, e.g., from component 730, in a database.

Assembly of components 700 further includes a component 734 configured to operate the control device to monitor signaling to detect a new client device, e.g. a client device which has just recently powered on and attached to or is attempting to attach to an AP, a component 736 configured to perform device identification operation(s), e.g., fingerprint a client device, a component 738 configured to determine if a detected client device is known, a component 740 configured to operate the control device to retrieve a stored client device profile in response to a determination that the detected client device is known, a component 742 configured to generate a new client device profile in response to a determination that the client device is not a known client device, a component 744 configured to determine if the client device supports communications in both the 2.4 GHz communications band and the 5 GHz communications band, e.g. based on the profile corresponding to the client device, a component 746 configured to determine that the client device is a candidate for band steering in response to a determination that the client device supports communications in both the 2.4 GHz communications band and the 5 GHz communication band, a component 748 configured to determine that the client device is not a candidate for band steering in response to a determination that the client device does not support communications in both the 2.4 GHz band and the 5 GHz communication band, and a component 750 configured to store information indicating whether or not the client device is a candidate for band steering.

Assembly of components 700 further includes a component 754 configured to call a bandsteering routine, e.g. to determine if a client device which is a candidate for bandsteering should be bandsteered or should remain on it s current band and to control operation as a function of the determination, a component 758 configured to call a channel change routine (for the 2.4 GHz band) to determine, for an AP, if the channel being used by the AP in the 2.4 GHz band should be changed and to control operation as a function of the determination, and a component 760 configured to configured to call a channel change routine (for the 5 GHz band) to determine, for an AP, if the channel being used by the AP in the 5 GHz band should be changed and to control operation as a function of the determination.

Assembly of components 700 further includes a bandsteering component 800 comprising Part A 801 and Part B 802. Bandsteering component 800 includes a component 804 configured to determine if a client device is using a channel in the 2.4 GHz band or a channel in the 5 GHz band, a component 806 configured to determine, based on client device reporting of captured BSS colors corresponding to received signals in the channel of the 2.4 GHz band, if the channel is congested from the client device's perspective, e.g., has the client device detects at least a predetermined number of additional APs (based on the additional colors) using the same channel of the 2.4 GHz band as the client device's AP is using (with its BSS color), a component 810 configured to control operation as a function of the congestion determination, a component 812 configured to determine if the client device is receiving enough resource units (RUs) to satisfy its needs and to control operation as a function of the determination, a component 814 configured to determine that the client device should remain on the channel of the 2.4 GHz band, e.g., in response to a determination that the client device is receiving enough RUs it satisfy its needs, and a component 816 configured to determine, based on client device reported RSSI, corresponding to the channel of the 5 GHz band being used by the client device's AP, if the client device satisfies, e.g., meets or exceeds, the threshold to be steered to the 5 GHz band.

Bandsteering component 800 further includes a component 818 configured to determine if the RSSI satisfies, e.g. meets or exceeds, the steer threshold and to control operation as a function of the determination, a component 820 configured to determine that the client device should remain on the channel of the 2.4 GHz band, e.g. in response to a determination that the client device does not satisfy the threshold to be steered to the 5 GHz band, and a component 822 configured to determine, based on the current load of the 5 GHz channel being used by the AP and the number of client devices currently using the 5 GHz channel of the AP, if the AP has enough reserve resource in the 5 GHz band to support the RU needs of the client device, e.g. in response to a determination that the client device satisfies the steer threshold to be steered to the 5 GHz band. Bandsteering component 800 further includes a component 824 configured to control operation based on the determination as to whether or not the AP has enough reserve resources in its channel of the 5 GHz band to support the RU needs of the client device, a component 826 configured to determine that the client device should remain on the channel of the 2.4 GHz band, e.g. in response to a determination that the AP does not have enough reserve resources in its channel of the 5 GHz band to support the RU needs of the client device, and a component 828 configured to determine that the client device should be bandsteered from the 2.4 GHz band to the 5 GHz band, e.g., in response to a determination that the AP has enough reserve resources in its channel of the 5 GHz band to support the RU needs of the client device.

Bandsteering component 800 further includes a component 828 configured to measure RUs currently dedicated to the client device, a component 832 configured to determine if the amount of resource currently dedicated to the client device is small, e.g., less than a first threshold, or larger, e.g. greater than or equal to the first threshold, and to control operation as a function of the determination, a component 834 configured to operate the control device to wait for the next RU determination of RUs dedicated to the client device before proceeding to determine again if the amount of resources currently dedicated to the client device is small or large, e.g., in response to a determination that the amount of resources currently dedicated to the client device is large, a component configured to operate the control device to send a command to the AP to bandsteer the client device to the 5 GHz band, e.g. in response to a determination that the amount of resources currently dedicated to the client device is small, and a component 815 configured to operate the control device to send a command to the AP to keep the client device on its current band (2.4 GHz band), e.g. in response to a determination by any of components 814, 820, or 826 that the client device should remain on the channel of the 2.4 GHz band.

Bandsteering component 800 further includes a component 840 configured to determine, based on client device reporting of captured BSS colors corresponding to received signals in the channel of the 5 GHz band, if the channel is congested from the client device's perspective, e.g., has the client device detects at least a predetermined number of additional APs (based on the additional colors) using the same channel of the 5 GHz band as the client device's AP is using (with its BSS color), a component 842 configured to control operation as a function of the congestion determination, a component 844 configured to determine if the client device is receiving enough resource units (RUs) to satisfy its needs and to control operation as a function of the determination, a component 846 configured to determine that the client device should remain on the channel of the 5 GHz band, e.g., in response to a determination that the client device is receiving enough RUs it satisfy its needs, and a component 848 configured to determine, based on client device reported RSSI, corresponding to the channel of the 2.4 GHz band being used by the client device's AP, if the client device satisfies the threshold to be steered to the 2.4 GHz band.

Bandsteering component 800 further includes a component 850 configured to determine if the RSSI satisfies, e.g. meets or exceeds, the steer threshold and to control operation as a function of the determination, a component 852 configured to determine that the client device should remain on the channel of the 5 GHz band, e.g. in response to a determination that the client device does not satisfy the threshold to be steered to the 2.4 GHz band, and a component 854 configured to determine, based on the current load of the 2.4 GHz channel being used by the AP and the number of client devices currently using the 2.4 GHz channel of the AP, if the AP has enough reserve resource in the 2.4 GHz band to support the RU needs of the client device, e.g. in response to a determination that the client device satisfies the steer threshold to be steered to the 2.4 GHz band. Bandsteering component 800 further includes a component 856 configured to control operation based on the determination as to whether or not the AP has enough reserve resources in its channel of the 2.4 GHz band to support the RU needs of the client device, a component 858 configured to determine that the client device should remain on the channel of the 5 GHz band, e.g. in response to a determination that the AP does not have enough reserve resources in its channel of the 2.4 GHz band to support the RU needs of the client device, and a component 860 configured to determine that the client device should be bandsteered from the 5 GHz band to the 2.4 GHz band, e.g., in response to a determination that the AP has enough reserve resources in its channel of the 2.4 GHz band to support the RU needs of the client device.

Bandsteering component 800 further includes a component 862 configured to measure RUs currently dedicated to the client device, a component 864 configured to determine if the amount of resource currently dedicated to the client device is small, e.g., less than a first threshold, or larger, e.g. greater than or equal to the first threshold, and to control operation as a function of the determination, a component 866 configured to operate the control device to wait for the next RU determination of RUs dedicated to the client device before proceeding to determine again if the amount of resources currently dedicated to the client device is small or large, e.g., in response to a determination that the amount of resources currently dedicated to the client device is large, a component 868 configured to operate the control device to send a command to the AP to bandsteer the client device to the 2.4 GHz band, e.g. in response to a determination that the amount of resources currently dedicated to the client device is small, and a component 847 configured to operate the control device to send a command to the AP to keep the client device on its current band (5 GHz band), e.g. in response to a determination by any of components 846, 852, or 858 that the client device should remain on the channel of the 5 GHz band.

Assembly of components 700 further includes a channel change component 902. Channel change component 902 includes a component 904 configured to determine an interference level for the channel being used by the AP, and a component 905 configured to make a channel change decision based on at least the interference level being used by the AP. Component 905 includes a component 906 configured to determine if the interference level on the channel being used by the AP is greater than threshold level L1 and to control operation as a function of the determination, a component 908 configured to determine that the AP should be changed to a different channel within a first predetermined time period, e.g. X minutes, e.g., in response to a determination that the interference level is greater than threshold level L1. (High level of interference results in relatively fast change to new channel.) Component 905 further includes a component 910 configured to determine if the interference level is less than or equal to threshold level L2 (where L2 is less than L1), and to control operation as a function of the determination, e.g. in response to a determination that the interference level is less than or equal to threshold level L1. Component 905 further includes a component 920 configured to determine that that AP should not change its channel, e.g. in response to a determination that the interference level is less than or equal to L2 (low level of interference-acceptable to remain on current channel), and a component 922 configured to determine that the AP should be changed to a different channel with a second predetermined time period (e.g. Y hours), where the second predetermined time is greater than the first predetermined time period, e.g., in response to a determination that the interference is greater than threshold level L2 and is less than or equal to threshold level L1 (determined intermediate level of interference-change channel but not urgent).

Component 905 further includes a component 912 configured to select a new channel and, in some embodiments, a BSS color to be associated with the new channel and the AP, said BSS color not currently being used by other APs in the local vicinity for the new selected channel, e.g., in response to the determination by component 908 that the AP should be changed to a different channel, and a component 913 configured to operate the control device to wait to send the channel steering assignment unit: i) the amount of active traffic on the channel being used by the AP is below a first active traffic threshold or ii) a first amount of time has expired from when said channel change decision was made. Component 913 includes a component 914 configured to determine if the amount of active traffic (e.g., based on RUs) on the channel being used by the AP is low, e.g., below a first active traffic threshold, and to control operation as a function of the determination, and a component 916 configured to determine if the first predetermined time has expired and to control operation as a function of the determination.

Component 905 further includes a component 922 configured to select a new channel and, in some embodiments, a BSS color to be associated with the new channel and the AP, said BSS color not currently being used by other APs in the local vicinity for the new selected channel, e.g., in response to the determination by component 921 that the AP should be changed to a different channel, and a component 923 configured to operate the control device to wait to send the channel steering assignment unit: i) the amount of active traffic on the channel being used by the AP is below a first active traffic threshold or ii) a second amount of time has expired from when said channel change decision was made. Component 923 includes a component 934 configured to determine if the amount of active traffic (e.g., based on RUs) on the channel being used by the AP is low, e.g., below a first active traffic threshold, and to control operation as a function of the determination, and a component 926 configured to determine if the second predetermined time has expired and to control operation as a function of the determination.

Component 905 further includes a component configured to make a decision to change channel, e.g., in response to a determination by one of components 914, 916, 924, or 926 that a condition for sending the steering assignment has been satisfied.

Channel change component 902 further includes a component 928 configured to operate the control device to send the channel steering assignment (CSA) to the AP, said channel steering assignment commanding the AP to change to the new selected channel, and in some embodiments, a selected BSS color.

Figure 8:
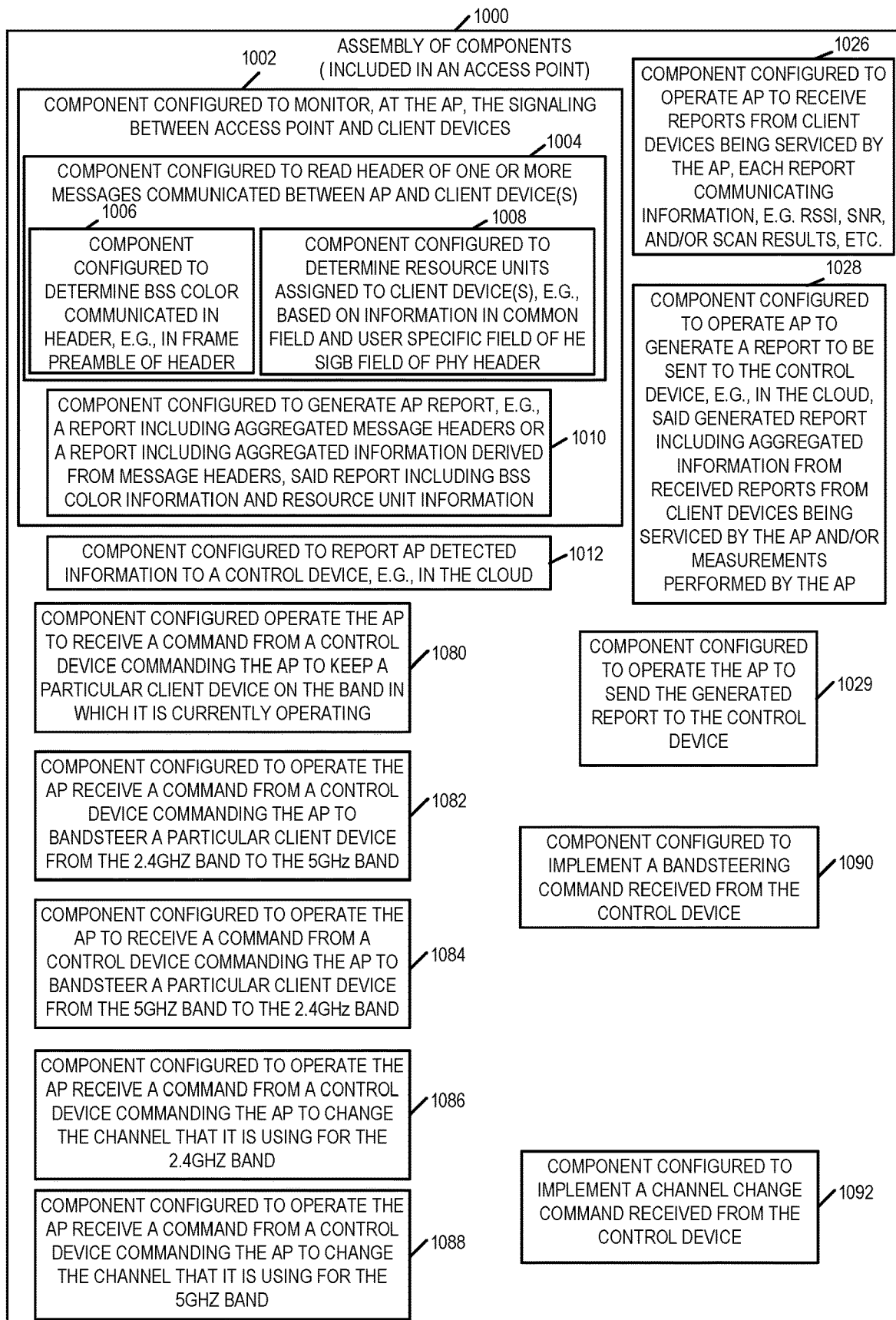
FIG. 8 is a drawing of an exemplary assembly of components which may be included in an access point, e.g. a Charter WiFi 6/6E router, in accordance with an exemplary embodiment.

FIG. 8 is a drawing of an exemplary assembly of components 1000 which may be included in an access point, e.g. a Charter WiFi 6/6E, router in accordance with an exemplary embodiment, e.g., AP 112 or AP 114 of system 100 of FIG. 1 and/or AP 600 of FIG. 6.

The components in the assembly of components 1000 can be, and in some embodiments are, implemented fully in hardware within the processor 602, e.g., as individual circuits. The components in the assembly of components 1000 can, and in some embodiments are, implemented fully in hardware within the assembly of hardware components 608, e.g., as individual circuits corresponding to the different components. In other embodiments some of the components are implemented, e.g., as circuits, within the processor 602 with other components being implemented, e.g., as circuits within assembly of components 608, external to and coupled to the processor 602. As should be appreciated the level of integration of components on the processor and/or with some components being external to the processor may be one of design choice. Alternatively, rather than being implemented as circuits, all or some of the components may be implemented in software and stored in the memory 612 of the access point 600, with the components controlling operation of the control device to implement the functions corresponding to the components when the components are executed by a processor, e.g., processor 602. In some such embodiments, the assembly of components 1000 is included in the memory 612 as assembly of software components 618 and/or as part of agent 616. In still other embodiments, various components in assembly of components 1000 are implemented as a combination of hardware and software, e.g., with another circuit external to the processor providing input to the processor 602 which then under software control operates to perform a portion of a component's function. While processor 602 is shown in the FIG. 6 embodiment as a single processor, e.g., computer, it should be appreciated that the processor 602 may be implemented as one or more processors, e.g., computers.

When implemented in software the components include code, which when executed by the processor 602, configure the processor 602 to implement the function corresponding to the component. In embodiments where the assembly of components 1000 is stored in the memory 612, the memory 612 is a computer program product comprising a computer readable medium comprising code, e.g., individual code for each component, for causing at least one computer, e.g., processor 602, to implement the functions to which the components correspond. Completely hardware based or completely software based components may be used. However, it should be appreciated that any combination of software and hardware, e.g., circuit implemented components may be used to implement the functions. As should be appreciated, the components illustrated in FIG. 8 control and/or configure the access point 600, or elements therein such as the processor 602, to perform the functions of corresponding steps illustrated and/or described in the method of one or more of the flowcharts, signaling diagrams and/or described with respect to any of the Figures. Thus the assembly of components 1000 includes various components that perform functions of corresponding one or more described and/or illustrated steps of an exemplary method, e.g., steps of the method of flowchart 200 of FIG. 2, steps of the method of flowchart 300 of FIG. 3 and/or steps of the method of flowchart 400 of FIG. 4 and/or described or shown with respect to any of the other figures.

Assembly of components 1000 includes a component 1002 configured to monitor, at the AP, the signaling between the access point and client devices. Component 1002 includes a component 1004 configured to read the header of one or more messages communicated between the AP and client device(s), and a component 1010 configured to generate an AP report, e.g., an AP report including aggregated message headers or a reported including aggregated information derived from message headers, said report include BSS color information and resource unit information. Component 1004 includes a component 1006 configured to determine BSS color communicated in a header, e.g. in a frame preamble of a header, and a component 1008 configured to determine resource units (RUs) assigned to one or more client devices, e.g., based on information in common field and user specific fields, e.g. of a high efficiency (HE) SIG-B field of a PHY header. Assembly of components 1000 further includes a component 1012 configured to report the AP detected information (e.g., from the monitoring of component 1002), to a control device, e.g. in the cloud. Thus component 1012 sends generated reports from component 1010 to the control device.

Assembly of components 1000 further includes a component 1026 configured to operate the AP to receive reports from client devices being serviced by the AP, each report communication information, e.g., RSSI, SNR, and/or scan results, and a component 1028 configured to operate the AP to generate a report to be sent to the control device, e.g., in the cloud, said generated report including aggregated information from received reports from client devices being service by the AP and/or measurements performed by the AP, and a component 1029 configured to operate the AP to send the generated report (e.g., from component 1028) to the control device.

Assembly of components 1000 further includes a component 1080 configured to operate the AP to receive a command from a control device commanding the AP to keep a particular client device in the band in which it is currently operating, a component 1082 configured to operate the AP to receive a command from a control device commanding the AP to bandsteer a particular client device from the 2.4 GHz band to the 5 GHz band, a component 1084 configured to operate the AP to receive a command from a control device commanding the AP to bandsteer a particular client device from the 5 GHz band to the 2.4 GHz band, a component 1086 configured to operate the AP to receive a command from a control device commanding the AP to change the channel that it is using for the 2.4 GHz band, and component 1088 configured to operate the AP to receive a command from a control device commanding the AP to change the channel that it is using for the 5 GHz band. In some embodiments, component 1086 further indicates, e.g., in the command or with the command, the new channel within the 2.4 GHz band to be used by the AP. In some embodiments, component 1086 further indicates, e.g., in the command or with the command, the BSS color to be used by the AP for the new channel in the 2.4 GHz band to be used by the AP. In some embodiments, component 1088 further indicates, e.g., in the command or with the command, the new channel within the 5 GHz band to be used by the AP. In some embodiments, component 1088 further indicates, e.g., in the command or with the command, the BSS color to be used by the AP for the new channel in the 5 GHz band to be used by the AP. Assembly of components 1000 further includes a component 1090 configured to implement a bandsteering command received from the control device, and a component 1092 configured to implement a channel change command received from the control device.

Figure 9:
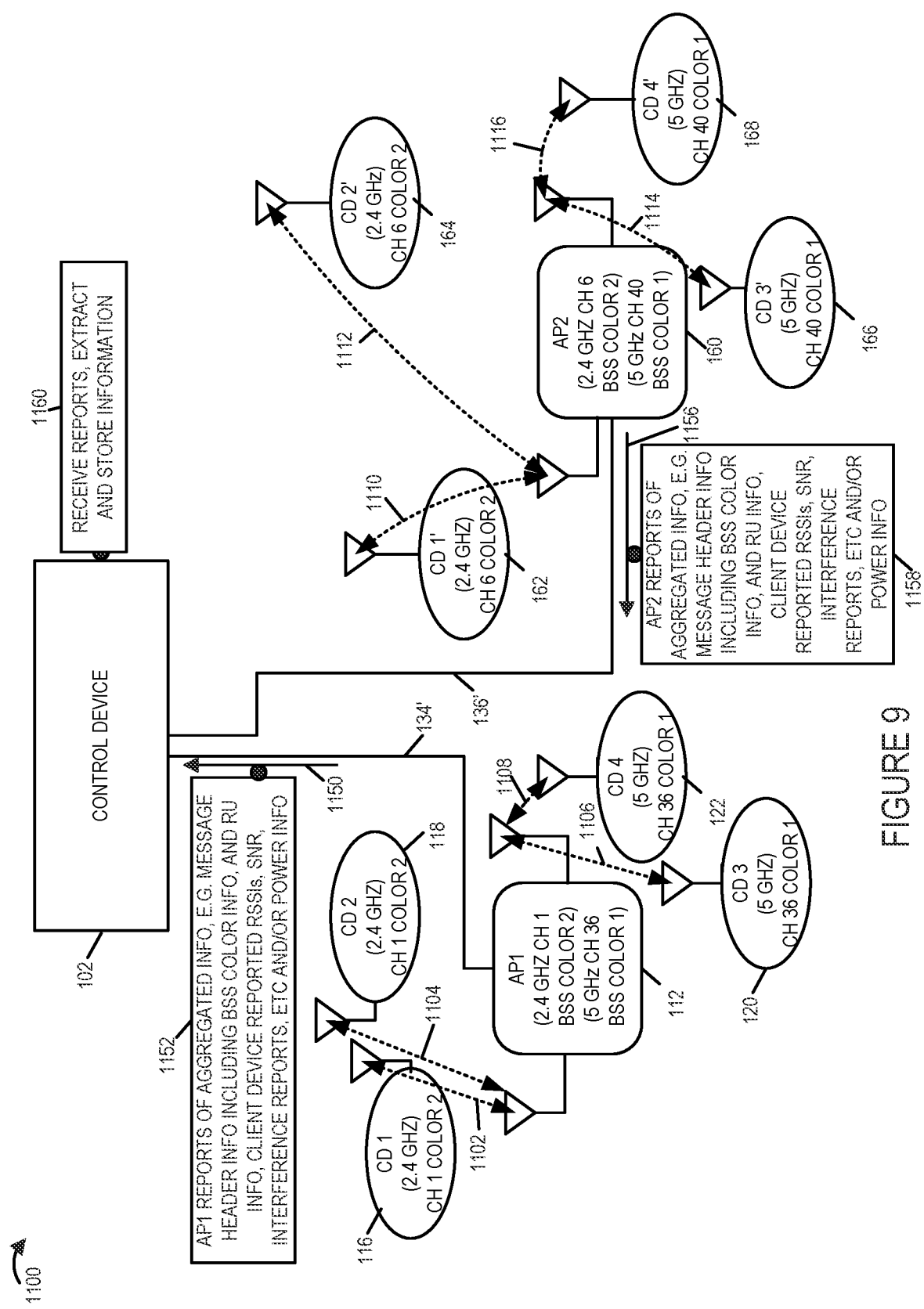
FIG. 9 is a drawing illustrating access points in an exemplary communications system which generate and send information reports on an ongoing basis to a control device, which uses the information in the reports in making band-steering and channel change decisions, in accordance with an exemplary embodiment.

FIG. 9 is a drawing 900 illustrating access points (access point 1 112, access point 2 160) in an exemplary communications system which generate and send information reports on an ongoing basis to a control device 102, which uses the information in the reports in making bandsteering and channel change decisions, in accordance with an exemplary embodiment.

AP1 112, e.g. a WiFi AP, which supports communications in both the 2.4 GHz band and the 5 GHz band, is currently operating on Channel 1 in the 2.4 GHz band and is set to BSS color value=2 and is currently operating on Channel 36 in the 5 GHz band and is set to BSS color value=1. Client device (CD) 1 116, which is being serviced by AP 1 112 is set to operate using channel 1 color value=2 of the 2.4 GHz band. Dashed bi-directional line 1102 represents wireless communications link between AP 1 112 and CD 1 116, which conveys messages including headers conveying BSS color information and RU information. In addition various CD1 generated reports, e.g., RSSI reports, SNR reports, interference reports, etc. are sent from CD1 116 to AP 1 112 over the wireless communications link 1102. Client device (CD) 2 118, which is being serviced by AP 1 112 is set to operate using channel 1 color value=2 of the 2.4 GHz band. Dashed bi-directional line 1104 represents wireless communications link between AP 1 112 and CD 2 118, which conveys messages including headers conveying BSS color information and RU information. In addition various CD2 generated reports, e.g., RSSI reports, SNR reports, interference reports, etc. are sent from CD2 118 to AP 1 112 over the wireless communications link 1104. Client device (CD) 3 120, which is being serviced by AP 1 112 is set to operate using channel 36 color value=1 of the 5 GHz band. Dashed bi-directional line 1106 represents wireless communications link between AP 1 112 and CD 3 120, which conveys messages including headers conveying BSS color information and RU information. In addition various CD 3 generated reports, e.g., RSSI reports, SNR reports, interference reports, etc. are sent from CD3 120 to AP 1 112 over the wireless communications link 1106. Client device (CD) 4 122, which is being serviced by AP 1 112 is set to operate using channel 36 color value=1 of the 5 GHz band. Dashed bi-directional line 1108 represents wireless communications link between AP 1 112 and CD 4 122, which conveys messages including headers conveying BSS color information and RU information. In addition various CD 4 generated reports, e.g., RSSI reports, SNR reports, interference reports, etc. are sent from CD4 122 to AP 1 112 over the wireless communications link 1108.

AP2 160, e.g. a WiFi AP, which supports communications in both the 2.4 GHz band and the 5 GHz band, is currently operating on Channel 6 in the 2.4 GHz band and is set to BSS color value=2 and is currently operating on Channel 40 in the 5 GHz band and is set to BSS color value=1. Client device (CD) 1' 162, which is being serviced by AP 2 160 is set to operate using channel 6 color value=2 of the 2.4 GHz band. Dashed bi-directional line 1110 represents wireless communications link between AP 2 160 and CD 1' 162, which conveys messages including headers conveying BSS color information and RU information. In addition various CD1' generated reports, e.g., RSSI reports, SNR reports, interference reports, etc. are sent from CD1' 162 to AP 2 160 over the wireless communications link 1110. Client device (CD) 2' 164, which is being serviced by AP 2 160 is set to operate using channel 6 color value=2 of the 2.4 GHz band. Dashed bi-directional line 1112 represents wireless communications link between AP 2 160 and CD 2' 164, which conveys messages including headers conveying BSS color information and RU information. In addition various CD2' generated reports, e.g., RSSI reports, SNR reports, interference reports, etc. are sent from CD2' 164 to AP 2 160 over the wireless communications link 1112. Client device (CD) 3' 166, which is being serviced by AP 2 160 is set to operate using channel 40 color value=1 of the 5 GHz band. Dashed bi-directional line 1114 represents wireless communications link between AP 2 160 and CD 3' 166, which conveys messages including headers conveying BSS color information and RU information. In addition various CD 3' generated reports, e.g., RSSI reports, SNR reports, interference reports, etc. are sent from CD3' 166 to AP 2 160 over the wireless communications link 1114. Client device (CD) 4' 168, which is being serviced by AP 2 160 is set to operate using channel 40 color value=1 of the 5 GHz band. Dashed bi-directional line 1116 represents wireless communications link between AP 2 160 and CD 4' 168, which conveys messages including headers conveying BSS color information and RU information. In addition various CD 4' generated reports, e.g., RSSI reports, SNR reports, interference reports, etc. are sent from CD4' 168 to AP 2 160 over the wireless communications link 1116.

AP1 112 collects information and generates reports 1152 of aggregated information, e.g. message header information including BSS color information and resource unit (RU) information, e.g. based on signaling being communicated between AP1 112 and the client devices (116, 118, 120, 122) it is servicing, received client device reported RSSI information, received client device reported SNR information, received client device interference reports, etc, and/or power information corresponding to the client devices it is servicing and send those reports 1152 via signals 1150 over backhaul connection path 134' to the control device 102.

Similarly, AP2 160 collects information and generates reports 1158 of aggregated information, e.g. message header information including BSS color information and resource unit (RU) information, e.g. based on signaling being communicated between AP2 160 and the client devices (162, 164, 166, 168) it is servicing, received client device reported RSSI information, received client device reported SNR information, received client device interference reports, etc, and/or power information corresponding to the client devices it is servicing and sends those reports 1158 via signals 1156 over backhaul connection path 136' to the control device 102.

Control device 102 receives the reports 1152, 1154, extract and stores the information. The data collection and reporting to the control device 102 is performing on an ongoing basis by each of the APs in the system. The control device 102 uses the reported information in addition to device profile information to make bandsteering and channel change decisions.

Figure 10:
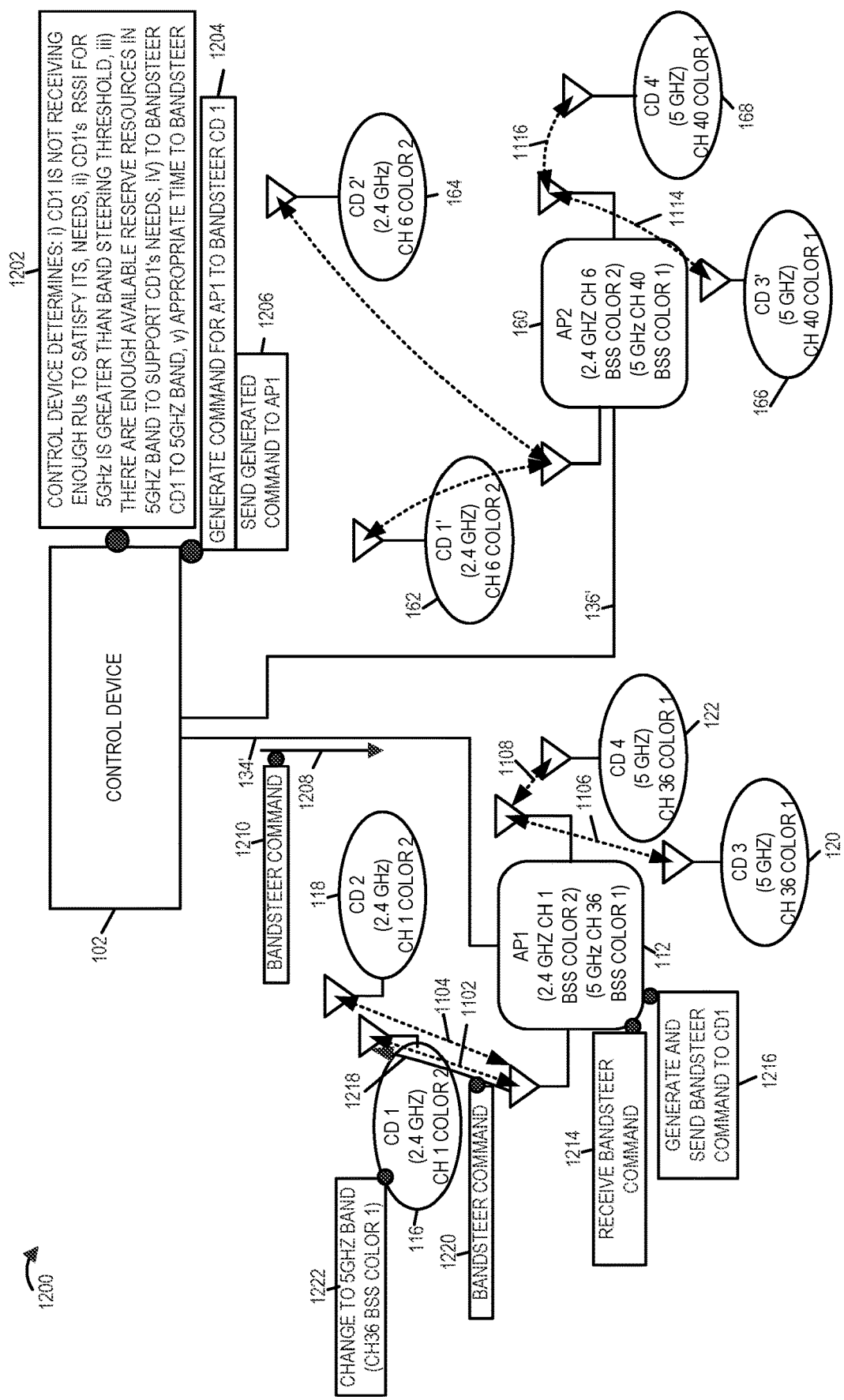
FIG. 10, which is a continuation of FIG. 9, illustrates exemplary bandsteering in accordance with an exemplary embodiment.

FIG. 10, which is a continuation of FIG. 9, illustrates exemplary bandsteering in accordance with an exemplary embodiment. The drawing 1200 of FIG. 10 illustrates, in box 1202, that the control device determines: i) client device 1 (CD1) 116 is not receiving enough RUs to satisfy its needs; ii) CD1's RSSI for the channel of the 5 GHz band being used by AP1 116 is greater than the band steering threshold; iii) that there are enough available reserve RUs in the 5 GHz band to support CD1's needs, iv) to bandsteer CD1 to the 5 GHz band, and v) the appropriate time to bandsteer. In step 1204 the control device generates a command for AP1 112 to bandsteer CD1 116. In step 1206, control device sends the generated bandsteer command 1210 to AP 1 1208 via signals 1208 over communications path 134'.

In step 1214, AP1 112 receives the bandsteer command. In step 1216, AP1 generates and sends a bandsteer command 1220 to CD1 116, via signals 1218. In step 1222 CD 1 116, in response to the received bandsteer command, changes from operating in the 2.4 GHz band to operating in the 5 GHz band using channel 36 and BSS color 1, as indicated by box 1222.

Figure 11:
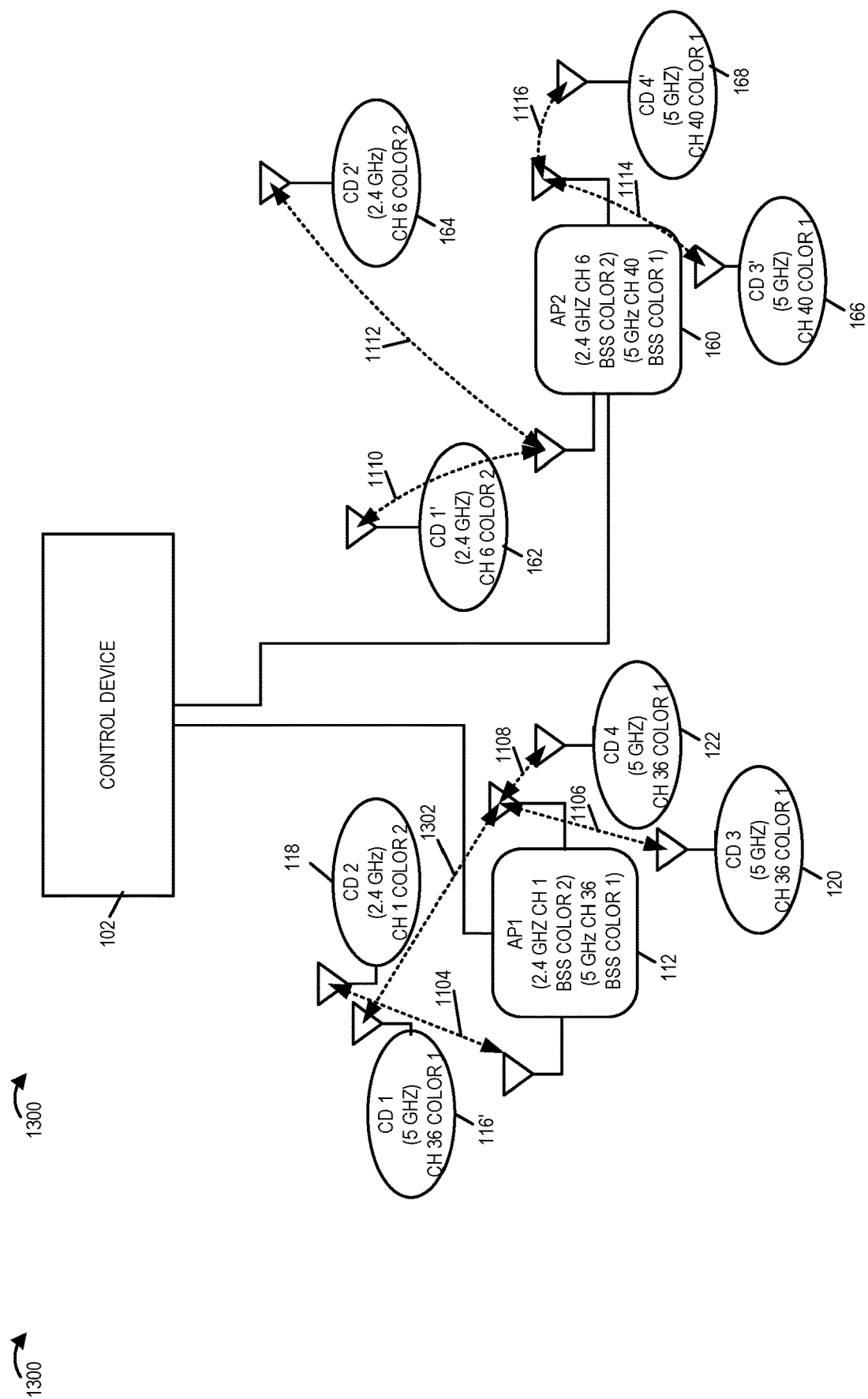
FIG. 11, which is a continuation of FIG. 10 illustrates, illustrates that an exemplary client device has been bandsteered from a first communications band to a second communications band and is now operating in the second communications band.

FIG. 11, which is a continuation of FIG. 10, shows in drawing 1300 that CD1, as indicated by CD1 116' has transitioned to operating in the 5 GHz band and is currently using channel 36 with BSS color value=1, to communicate with AP1 112, and has established wireless communications link 1302.

Figure 12:
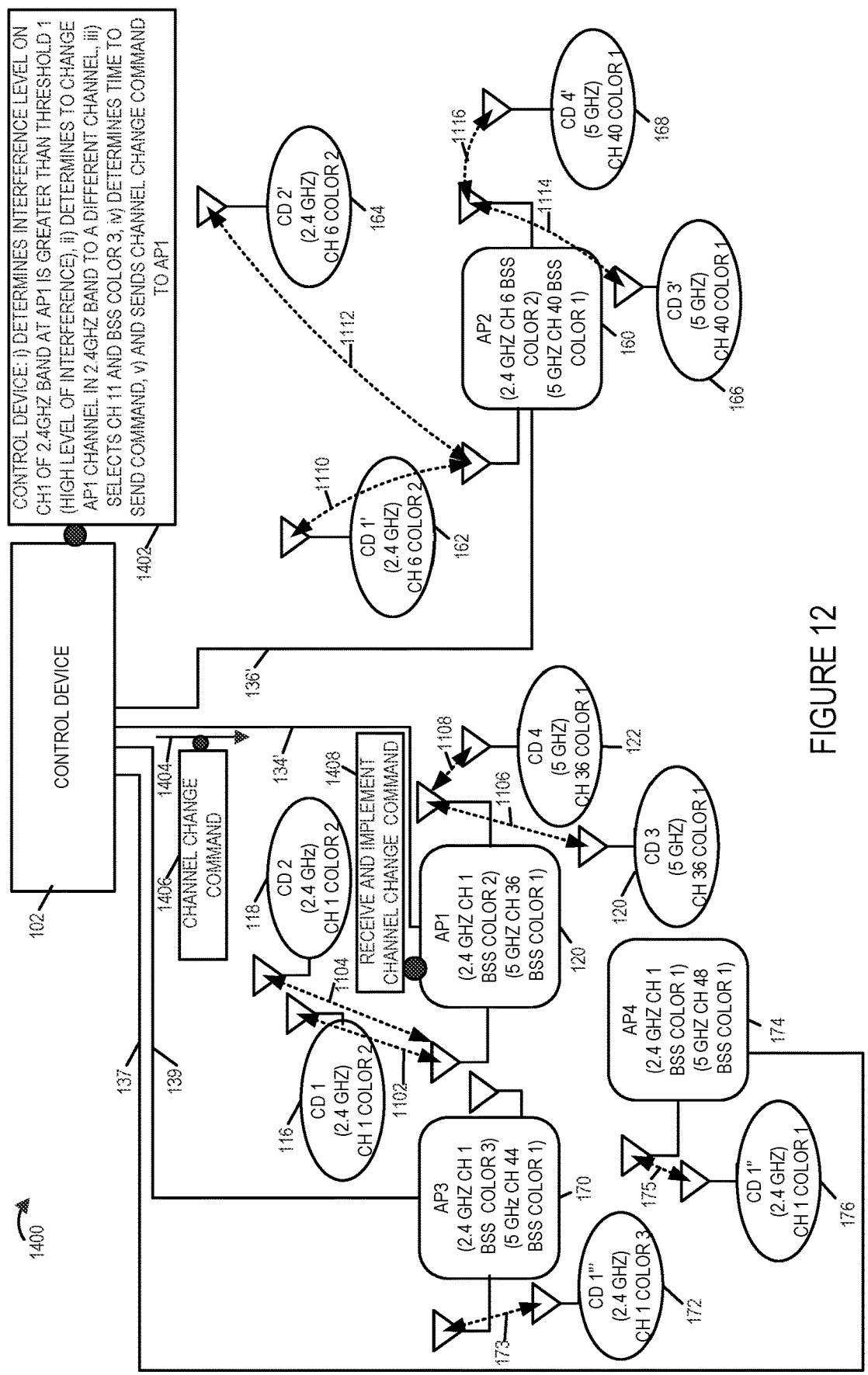
FIG. 12, which is a continuation of FIG. 9, illustrates exemplary channel steering in accordance with an exemplary embodiment.
Figure 13:
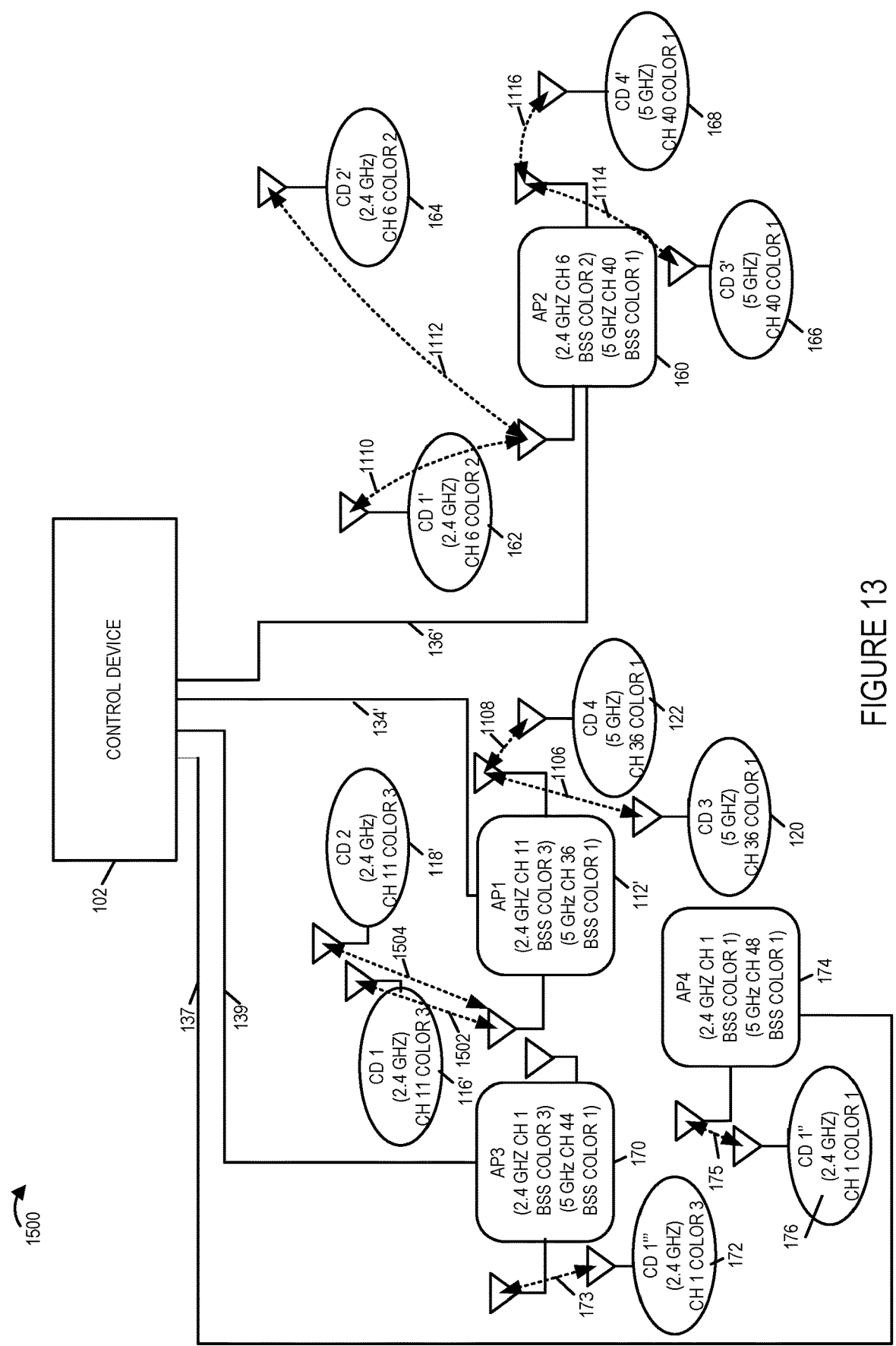
FIG. 13, which is a continuation of FIG. 12, illustrates the configuration following the implementation of the channel change command, in which a first access point and two exemplary client devices being serviced by the first access point have been steered to using a different channel in a first communications band, e.g. in response to detected congestion.

FIG. 12, which is a continuation of FIG. 9, illustrates exemplary channel steering in accordance with an exemplary embodiment. Drawing 1400 of FIG. 13 illustrates that additional access points (AP3 170 and AP4 174) are now active in the system.

AP3 170, e.g. a WiFi AP, which supports communications in both the 2.4 GHz band and the 5 GHz band, is currently operating on Channel 1 in the 2.4 GHz band and is set to BSS color value=3 and is currently operating on Channel 44 in the 5 GHz band and is set to BSS color value=1. Client device (CD) 1" 172, which is being serviced by AP 3 170 is set to operate using channel 1 color value=3 of the 2.4 GHz band. Dashed bi-directional line 173 represents wireless communications link between AP 3 170 and CD 1" 172, which conveys messages including headers conveying BSS color information and RU information. In addition various CD1" generated reports, e.g., RSSI reports, SNR reports, interference reports, etc. are sent from CD1" 172 to AP 3 170 over the wireless communications link 173.

AP4 174, e.g. a WiFi AP, which supports communications in both the 2.4 GHz band and the 5 GHz band, is currently operating on Channel 1 in the 2.4 GHz band and is set to BSS color value=1 and is currently operating on Channel 48 in the 5 GHz band and is set to BSS color value=1. Client device (CD) 1''' 176, which is being serviced by AP 4 174 is set to operate using channel 1 color value=1 of the 2.4 GHz band. Dashed bi-directional line 175 represents wireless communications link between AP 4 174 and CD 1''' 176, which conveys messages including headers conveying BSS color information and RU information. In addition various CD1''' generated reports, e.g., RSSI reports, SNR reports, interference reports, etc. are sent from CD1''' 176 to AP 4 176 over the wireless communications link 175.

It should be appreciated that each of the APs (112, 160, 170, 174) is collecting information, generating reports of aggregated information, and sending the reports to the control device 102 on an ongoing basis, so that the control device has an overall view of the conditions in the system including interference and resource utilization levels.

Control device 102 performs the following steps: i) determines that the interference level on channel 1 of the 2.4 GHz band at AP1 112 is greater than threshold level 1, indicating a high level of interference, ii) determines to change AP1s channel in the 2.4 GHz band to a different channel, iii) selects channel 11 and BSS color value=3, iv) determines the time to send the command, and v) sends a channel change command 1406 to AP 1 112, via signals 1404, over backhaul path 134', as indicated by box 1402. In step 1408 AP 1 112 receives and implements the channel change command.

Drawing 1500 of FIG. 13 illustrates the configuration following the implementation of the channel change command. AP1, now shown as element 112', is now operating using channel 11 with BSS color value=3 for the 2.4 GHz band. Client device (CD 1), now shown as CD1" 116", is now is operating using channel 11 with BSS color value=3 for the 2.4 GHz band and there is a wireless connection 1502 between AP1 112' and CD1 116". Client device 2 (CD 2), now shown as CD2" 118", is now is operating using channel 11 with BSS color value=3 for the 2.4 GHz band and there is a wireless connection 1504 between AP1 112' and CD2 118".

Various aspects and/or features of some embodiments are further discussed below. Various features and/or aspects related to bandsteering will now be described. In some embodiments, resource units (RUs) that have been assigned to a client device are taken into account, e.g., by the control device, before bandsteering the client device. In various embodiments, RUs which have been assigned to clients can be, and sometimes are viewed, e.g. by the control device, e.g., via a log pull.

Various features and/or aspects related to channel change will now be discussed. In some embodiments, BSS color is taken into account, e.g. by the control device, using a BSS color identifier, when other radios (e.g. other access point radios) transmit same channel, as the channel being used by the access point for which a channel change is being considered. In various embodiments, the control device has the ability, and sometimes does, view collision reports in the logs. In some embodiments, the control device and/or or the access point takes into account target wake time (TWT) and resource unit (RU) allocation in making decisions on channel change.

Various features and/or aspects related to Target Wake Time will now be described. In some embodiments, the ability to log channel sounding and buffers occupancy is provided. In some embodiments, the control device actively coordinated TWT schedules between clients such that the clients have non-overlapping schedules.

In some embodiments, a client device is not bandsteered while the client device is undergoing identification operations, e.g. fingerprinting operations, e.g., to avoid disruptions in the system. In some embodiments, an access point and the client devices being service by the access point, on a channel being used by the access point, are not channel steered while a client device using the channel of the AP is undergoing identification operations, e.g. fingerprinting operations, e.g., to avoid disruptions in the system.

Various embodiments, in accordance with the present invention are well suited for use in systems including access points using a plurality of communications bands concurrently and/or which include resource unit allocation information and/or BSS color information in message headers, e.g. a WiFi system in accordance with 802.11ax.

Although described in the context of a first communications band which is a 2.4 GHz band and a second communications band which is a 5 GHz band, the described methods and apparatus as also suitable for use in embodiments using a different set of bands.

Numbered List of Exemplary Method Embodiments

Method Embodiment 1 A method of controlling wireless resource utilization, the method comprising: determining (318) whether a first client device has reported a received signal strength indicator (RSSI) corresponding to the second frequency band that satisfies (e.g., meets or exceeds) a steering threshold for steering the first client device to a second frequency band (e.g., 5 GHz band); and instructing (315 or 336) the first access point, based on said determination as to whether the first client device has reported a received signal strength indicator (RSSI) corresponding to the second frequency band that satisfies the steering threshold for steering the first client device to the second frequency band, to: i) keep (315) the first client device on a first frequency band (e.g., 2.4 GHz band) or ii) steer (336) the first client device to the second frequency band.

Method Embodiment 2 The method of Method Embodiment 1, further comprising: prior to instructing (315 or 336) the first access point, determining (310) based on received BSS color information if the first frequency band (e.g., 2.4 GHz band) is congested due to use of the first frequency band by multiple access points (APs).

Method Embodiment 2A The method of Method Embodiment 2, wherein said instructing (315 or 336) includes instructing (315) the first AP to keep the first client device on the first frequency band in response to determining (310) based on reported BSS color information that the first frequency band is not congested.

Method Embodiment 3. The method of Method Embodiment 2, wherein said instructing (315 or 336) includes instructing (336) the first AP to steer the first client device to the second frequency band.

Method Embodiment 4 The method of Method Embodiment 3, further comprising: prior to instructing the first access point to steer the first client device to the second frequency band, checking (324) the second frequency band to determine if the second frequency band has sufficient resources available to satisfy the resource needs of the first client device.

Method Embodiment 5 The method of Method Embodiment 4, wherein said step of instructing (336) the first AP to steer the first client device to the second frequency band is conditional upon the first frequency band being congested and the second frequency band having sufficient available resources to satisfy the resource needs of the first client device.

Method Embodiment 6 The method of Method Embodiment 1, further comprising: making a channel change decision (405) based on an interference level on a first channel being used by the first client device (e.g., a channel in the frequency band (2.4 GHz or 5 GHz currently being used by the first AP).

Method Embodiment 7 The method of Method Embodiment 6, wherein making a channel change decision (405) based on an interference level on a first channel being used by the first client device includes: comparing said interference level to a first interference level threshold (L1).

Method Embodiment 8 The method of Method Embodiment 7, wherein said channel change decision is a decision (408) to change the channel being used by the first AP when the interference level exceeds the first interference level threshold.

Method Embodiment 9 The method of Method Embodiment 8, further comprising: sending (428) a channel steering assignment to the first AP to command the first AP to change the channel being used by the first AP (e.g., in the frequency band being used by the first client device).

Method Embodiment 10 The method of Method Embodiment 9, further comprising: checking (414) the amount of traffic on the channel being used by the first AP to determine if it is below a first active traffic channel threshold.

Method Embodiment 11 The method of Method Embodiment 10, wherein the method further includes: waiting (413) to send the channel steering assignment until i) the amount of active traffic on the first channel is below the first active traffic or ii) a first amount of time has expired from said channel change decision was made.

Method Embodiment 12 The method of Method Embodiment 7, wherein making a channel change decision (405) based on an interference level on a first channel being used by the first client device includes, when said interference level is below or equal to the first interference level threshold: comparing (410) said interference level to a second interference level threshold (L2); determining (420) that the first AP should not change its channel when the interference level is below the second threshold; and determining (421) that the first AP should change its channel when the interference level is above the second threshold (and below the first threshold since this step is performed after the comparison in step 406 to the first higher threshold).

Method Embodiment 13 The method of Method Embodiment 12, further comprising: checking (424) the amount of traffic on the channel being used by the first AP to determine if it is below a second active traffic channel threshold, said second active traffic threshold being the same or different from said first active traffic channel threshold.

Method Embodiment 14 The method of Method Embodiment 13, wherein the method further includes: waiting (423) to send the channel steering assignment until i) the amount of active traffic on the first channel is below the first active traffic or ii) a second amount of time has expired from said channel change decision was made (wherein the second amount of time is the same or longer than the first amount of time since the channel change decision is less pressing given that the interference is lower than when the first interference threshold is exceeded).

Method Embodiment 15 The method of Method Embodiment 6, wherein band change decisions are made more frequently than channel change decisions (e.g., at a frequency at least twice the frequency at which channel change decisions are made. This is because band change decisions affect simply the client device to which the decision relates while channel change decisions affect potentially multiple devices being serviced by an AP using the channel and a channel change decision requires the client devices to switch to the new channel when the AP implements the channel change switch making channel changes potentially more disruptive than band changes).

Numbered List of Exemplary Apparatus Embodiments

Apparatus Embodiment 1. A control device (e.g., a radio resource management device/agent) (102 or 500) for controlling wireless resource utilization, the control device comprising: an interface (504) for communicating with access points (112, . . . , 114); a processor (502) configured to operate the control device to: determine, (318) whether a first client device (e.g., wireless communications device 116) has reported a received signal strength indicator (RSSI) corresponding to a second frequency band that satisfies (e.g., meets or exceeds) a steering threshold for steering the first client device to the second frequency band (e.g., 5 GHZ band); and instruct (315 or 336) a first access point (e.g., service provider access point 1 112 or AP 600), based on said determination as to whether the first client device has reported a received signal strength indicator (RSSI) corresponding to the second frequency band that satisfies the steering threshold for steering the first client device to the second frequency band, to: i) keep (315) the first client device on a first frequency band (e.g., 2.4 GHz band) or ii) steer (336) the first client device to the second frequency band.

Apparatus Embodiment 2 The control device of Apparatus Embodiment 1, wherein said processor is further configured to: determine (310), based on received BSS color information, if the first frequency band (e.g., 2.4 GHz) is congested due to use of the first frequency band by multiple access points (APs), said determining if the first frequency band is congested being prior to said instructing (315 or 336) the first access point.

Apparatus Embodiment 2A The control device of Apparatus Embodiment 2, wherein processor is configured to: instruct (315) the first AP to keep the first client device on the first frequency band in response to determining (310) based on reported BSS color information that the first frequency band is not congested, as part of being configured to instruct (315 or 336) a first access point.

Apparatus Embodiment 3 The control device of Apparatus Embodiment 2, wherein said processor is configured to: instruct (336) the first AP to steer the first client device to the second frequency band, as part of being configured to instruct (315 or 336) the first access point.

Apparatus Embodiment 4 The control device of Apparatus Embodiment 3, wherein said processor is further configured to: check (324) the second frequency band to determine if the second frequency band has sufficient resources available to satisfy the resource needs of the first client device, said checking being performed prior to said instructing the first access point to steer the first client device to the second frequency band.

Apparatus Embodiment 5 The control device of Apparatus Embodiment 4, wherein said step of instructing (336) the first AP to steer the first client device to the second frequency band is conditional upon the first frequency band being congested and the second frequency band having sufficient available resources to satisfy the resource needs of the first client device.

Apparatus Embodiment 6 The control device of Apparatus Embodiment 1, wherein said processor is further configured to: make a channel change decision (405) based on an interference level on a first channel being used by the first client device (e.g., a channel in the frequency band (2.4 GHz or 5 GHz currently being used by the first AP).

Apparatus Embodiment 7 The control device of Apparatus Embodiment 6, wherein said processor is further configured to compare said interference level to a first interference level threshold (L1), as part of being configured to make a channel change decision (405) based on an interference level on a first channel being used by the first client device.

Apparatus Embodiment 8 The control device of Apparatus Embodiment 7, wherein said channel change decision is a decision (408) to change the channel being used by the first AP when the interference level exceeds the first interference level threshold.

Apparatus Embodiment 9 The control device of Apparatus Embodiment 8, wherein said processor is further configured to: operate the control device to send (428) a channel steering assignment to the first AP to command the first AP to change the channel being used by the first AP (e.g., in the frequency band being used by the first client device).

Apparatus Embodiment 10 The control device of Apparatus Embodiment 9, wherein said processor is further configured to: check (414) the amount of traffic on the channel being used by the first AP to determine if it is below a first active traffic channel threshold.

Apparatus Embodiment 11 The control device of claim 10, wherein said processor is further configured to: control the control device to wait (413) to send the channel steering assignment until i) the amount of active traffic on the first channel is below the first active traffic or ii) a first amount of time has expired from said channel change decision was made.

Apparatus Embodiment 12 The control device of Apparatus Embodiment 7, said processor is configured to: compare (410) said interference level to a second interference level threshold (L2); determine (420) that the first AP should not change its channel when the interference level is below the second threshold; and determine (421) that the first AP should change its channel when the interference level is above the second threshold (and below the first threshold since this step is performed after the comparison in step 406 to the first higher threshold), as part of being configured to make a channel change decision (405) based on an interference level on a first channel being used by the first client device when said interference level is below or equal to the first interference level threshold.

Apparatus Embodiment 13 The control device of Apparatus Embodiment 12, wherein said processor is further configured to: check (424) the amount of traffic on the channel being used by the first AP to determine if it is below a second active traffic channel threshold, said second active traffic threshold being the same or different from said first active traffic channel threshold.

Apparatus Embodiment 14 The control device of Apparatus Embodiment 13, wherein said processor is further configured to: control the control device to wait (423) to send the channel steering assignment until i) the amount of active traffic on the first channel is below the first active traffic or ii) a second amount of time has expired from said channel change decision was made (wherein the second amount of time is the same or longer than the first amount of time since the channel change decision is less pressing given that the interference is lower than when the first interference threshold is exceeded).

Apparatus Embodiment 15 The control device of Apparatus Embodiment 6, wherein band change decisions are made more frequently than channel change decisions (e.g., at a frequency at least twice the frequency at which channel change decisions are made. This is because band change decisions affect simply the client device to which the decision relates while channel change decisions affect potentially multiple devices being serviced by an AP using the channel and a channel change decision requires the client devices to switch to the new channel when the AP implements the channel change switch making channel changes potentially more disruptive than band changes).

Numbered List of Exemplary System Embodiments

System Embodiment 1 A system (100) comprising: a control device (e.g., a radio resource management device/agent) (102 or 500) for controlling wireless resource utilization, the control device including: an interface (504) for communicating with access points (112, ..., 114); a first processor (502) configured to operate the control device to: determine, (318) whether a first client device (e.g., wireless communications device 116) has reported a received signal strength indicator (RSSI) corresponding to a second frequency band that satisfies (e.g., meets or exceeds) a steering threshold for steering the first client device to the second frequency band (e.g., 5 GHZ band); and instruct (315 or 336) a first access point (e.g., service provider access point 1 112 or AP 600), based on said determination as to whether the first client device has reported a received signal strength indicator (RSSI) corresponding to the second frequency band that satisfies the steering threshold for steering the first client device to the second frequency band, to: i) keep (315) the first client device on a first frequency band (e.g., 2.4 GHz band) or ii) steer (336) the first client device to the second frequency band.

System Embodiment 2 The system of System Embodiment 1, further comprising: said first access point (112 or 600), wherein said first access point includes: a network interface (600) for communicating with the control device; a first wireless interface (605) for communicating with client devices using the first frequency band; a second wireless interface (607) for communicating with client devices using the second frequency band; and a second processor (602) configured to operate the access point to: send reports (e.g., header information reports including BSS color information and RU information, RSSI information reports, SNR information reports, interference information reports, and/or scan information reports, etc.) to the control device; receive band steering instructions from the control device; and receive channel steering instructions from the control device.

System Embodiment 3 The system of System Embodiment 2, wherein said second processor is further configured to: band steer said first client device in response to a received band steering instruction from the control device.

System Embodiment 4 The system of System Embodiment 2, wherein said second processor is further configured to change the channel being used by the first access point in the first frequency band in response to a first received channel steering instruction from the control device.

System Embodiment 5 The system of System Embodiment 2, wherein said second processor is further configured to change the channel being used by the first access point in the second frequency band in response to a second received channel steering instruction from the control device.

Numbered List of Exemplary Non-Transitory

Computer Readable Medium Embodiments

Non-transitory computer readable medium Embodiment 1 A non-transitory computer readable medium (510) including computer executable instructions which when executed by a processor (502) of a control device (102 or 500) cause the control device (102 or 500) to: determine (318) whether a first client device has reported a received signal strength indicator (RSSI) corresponding to the second frequency band that satisfies (e.g., meets or exceeds) a steering threshold for steering the first client device to a second frequency band (e.g., 5 GHz band); and instruct (315 or 336) the first access point, based on said determination as to whether the first client device has reported a received signal strength indicator (RSSI) corresponding to the second frequency band that satisfies the steering threshold for steering the first client device to the second frequency band, to: i) keep (315) the first client device on a first frequency band (e.g., 2.4 GHz band) or ii) steer (336) the first client device to the second frequency band.

In some embodiments, the processor or processors, e.g., CPUs, of one or more devices, are configured to control the devices, e.g. devices in which they are located and/or coupled to, to perform the steps of the methods described as being performed. The configuration of the processor may be achieved by using one or more components, e.g., software components, to control processor configuration and/or by including hardware in the processor, e.g., hardware components, to perform the recited steps and/or control processor configuration. The components in devices may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g. one or more steps described above.

Depending on the embodiment, the computer program product can, and sometimes does, include different code for each step to be performed. Thus, the computer program product may, and sometimes does, include code for each individual step of a method, e.g., a method of controlling a controller or node or device. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as an optical line terminal or optical modem. In some embodiments components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a control device to control wireless resource utilization of a first access point, the method comprising:
   determining, at the control device, an interference level on a first channel being used by the first access point;
   comparing the interference level on the first channel to a first interference level threshold;
   determining, based on said comparison, that the first access point should be changed to a different channel;
   selecting, in response to determining that the first access point should be changed to a different channel, a new channel to which the first access point is to be switched, said new channel being a different channel from the first channel;
   selecting a basic service set (BSS) color to be used by the first access point with the new channel, said selected BSS color not currently being used by other access points in the local vicinity of the first access point; and
   sending a command to the first access point to change to the new channel.

2. The method of claim 1, wherein:
   said interference level on the first channel exceeding the first interference level threshold results in a decision to change the first access point to a different channel.

3. The method of claim 1, wherein sending a command to the first access point to change to the new channel includes sending a channel steering assignment commanding the first access point to change to the new channel and selected BSS color.

4. The method of claim 3, further comprising:
   waiting to send the channel steering assignment until: i) an amount of active traffic on the first channel is below a first active traffic amount or ii) a first amount of time has expired from when said determination that the first access point should be changed to a different channel was made.

5. The method of claim 1, wherein the first access point is a WiFi access point.

6. The method of claim 5, further comprising:
   checking if the amount of active traffic on the first channel being used by the first access point is below a first active traffic threshold.

7. The method of claim 6,
   wherein sending a command to the first access point to change to the new channel includes sending a channel steering assignment to the first access point.

8. The method of claim 7, wherein said channel steering assignment includes the selected BSS color to be used by the first access point with the new channel.

9. The method of claim 8, further comprising:
   waiting to send the channel steering assignment until: i) the amount of active traffic on the first channel is below the first active traffic threshold or ii) a first amount of time has expired from when said determination that the first access point should be changed to a different channel was made.

10. The method of claim 9, wherein the method includes sending the channel steering assignment when the amount of active traffic on the first channel is below the first active traffic threshold.

11. The method of claim 9, wherein the method includes sending the channel steering assignment when the first amount of time has expired from when said determination that the first access point should be changed to a different channel was made.

12. A control device for controlling wireless resource utilization, the control device comprising:
an interface for communicating with access points;
a processor configured to operate the control device to:
determine an interference level on a first channel being used by a first access point;
compare the interference level on the first channel to a first interference level threshold;
determine, based on said comparison, that the first access point should be changed to a different channel;
select, in response to determining that the first access point should be changed to a different channel, a new channel to which the first access point is to be switched, said new channel being a different channel from the first channel;
select a basic service set (BSS) color to be used by the first access point with the new channel, said selected BSS color not currently being used by other access points in the local vicinity of the first access point; and
send a command to the first access point to change to the new channel.

13. The control device of claim 12, wherein said interference level on the first channel exceeding the first interference level threshold results in a decision to change the first access point to a different channel.

14. The control device of claim 12, wherein the processor is configured, as part of being configured to control the control device to send a command to the first access point to change to the new channel, to control the control device to send a channel steering assignment commanding the first access point to change to the new selected channel and selected BSS color.

15. The control device of claim 14, wherein the processor is further configured to control the control device to:
wait to send the channel steering assignment until: i) an amount of active traffic on the first channel is below a first active traffic amount or ii) a first amount of time has expired from when said determination that the first access point should be changed to a different channel was made.

16. The control device of claim 12, wherein the first access point is a WiFi access point.

17. The control device of claim 12, wherein the processor is further configured to control the control device to:
check if the amount of active traffic on the first channel being used by the first access point is below a first active traffic threshold.

18. The control device of claim 17,
wherein sending a command to the first access point to change to the new channel includes sending a channel steering assignment to the first access point.

19. The control device of claim 18, wherein said channel steering assignment includes the selected BSS color to be used by the first access point with the new channel.

20. A non-transitory computer readable medium including computer executable instructions which when executed by a processor of a control device cause the control device to:
determine an interference level on a first channel being used by a first access point;
compare the interference level on the first channel to a first interference level threshold;
determine, based on said comparison, that the first access point should be changed to a different channel;
select, in response to determining that the first access point should be changed to a different channel, a new channel to which the first access point is to be switched, said new channel being a different channel from the first channel;
select a basic service set (BSS) color to be used by the first access point with the new channel, said selected BSS color not currently being used by other access points in the local vicinity of the first access point; and
send a command to the first access point to change to the new channel.

\* \* \* \* \*